US011773525B2

(12) United States Patent
Bhargava et al.

(10) Patent No.: US 11,773,525 B2
(45) Date of Patent: Oct. 3, 2023

(54) DOUBLE-ROTOR WASHING TYPE DRUM WASHING MACHINE

(71) Applicant: WHIRLPOOL CORPORATION, Benton Harbor, MI (US)

(72) Inventors: Krati Bhargava, Stevensville, MI (US); Fang Deng, Novi, MI (US); James B. Hull, St. Joseph, MI (US); Wang Jun, Hefei (CN); Dennis Kehl, Benton Harbor, MI (US); Weitao Yang, Hefei (CN)

(73) Assignee: Whirlpool Corporation, Benton Harbor, MI (US)

( * ) Notice: Subject to any disclaimer, the term of this patent is extended or adjusted under 35 U.S.C. 154(b) by 303 days.

(21) Appl. No.: 16/808,869

(22) Filed: Mar. 4, 2020

(65) Prior Publication Data
US 2020/0347538 A1  Nov. 5, 2020

Related U.S. Application Data

(60) Provisional application No. 62/842,083, filed on May 2, 2019.

(51) Int. Cl.
| | | |
|---|---|---|
| *D06F 37/30* | (2020.01) | |
| *D06F 21/02* | (2006.01) | |
| *D06F 21/14* | (2006.01) | |
| *D06F 37/06* | (2006.01) | |
| *D06F 37/40* | (2006.01) | |
| *H02K 16/02* | (2006.01) | |

(52) U.S. Cl.
CPC ............ *D06F 37/304* (2013.01); *D06F 21/02* (2013.01); *D06F 21/14* (2013.01); *D06F 37/06* (2013.01); *D06F 37/40* (2013.01); *H02K 16/02* (2013.01)

(58) Field of Classification Search
CPC ........ D06F 37/304; D06F 37/40; D06F 21/02; D06F 21/04; D06F 21/10; D06F 37/206; D06F 37/22; D06F 37/24; D06F 21/06; D06F 21/08; D06F 21/12; D06F 21/14; D06F 23/00; D06F 23/02; D06F 23/025; D06F 23/04; D06F 23/06; D06F 23/065
See application file for complete search history.

(56) References Cited

U.S. PATENT DOCUMENTS 5,931,029 A * 8/1999 Kim ...................... H02K 16/00
                                                                   68/133
6,257,027 B1   7/2001 Imai
(Continued)

FOREIGN PATENT DOCUMENTS

| CN | 202644206 | 1/2013 |
| CN | 203530685 | 4/2014 |

(Continued)

*Primary Examiner* — David G Cormier
(74) *Attorney, Agent, or Firm* — Price Heneveld LLP

(57) ABSTRACT

A laundry appliance includes a drum that is rotationally operable about a rotational axis within a tub. The rotational axis is oriented in a generally horizontal configuration. An impeller is rotationally operable within the drum about the rotational axis. A dual-rotor motor is coupled to the drum and the impeller for providing separate and independent rotation of the drum and impeller about the rotational axis. An inner rotor of the dual-rotor motor is coupled with the impeller and an outer rotor of the dual-rotor motor is coupled with the drum.

13 Claims, 19 Drawing Sheets

(56) References Cited

U.S. PATENT DOCUMENTS

| | | |
|---|---|---|
| 7,557,486 B2 | 7/2009 | Choi et al. |
| 8,987,962 B2 | 3/2015 | Kim |
| 9,279,209 B2 | 3/2016 | Jun et al. |
| 9,312,743 B2 | 4/2016 | Kim et al. |
| 9,347,166 B2 | 5/2016 | Carr et al. |
| 9,896,794 B2 | 2/2018 | Kim |
| 9,988,752 B2 | 6/2018 | Kim et al. |
| 10,214,846 B2 | 2/2019 | Song |
| 2006/0042022 A1 | 3/2006 | Kim et al. |
| 2010/0058817 A1 | 3/2010 | Koshikawa et al. |
| 2010/0156216 A1* | 6/2010 | Lee .................. D06F 37/304 310/89 |
| 2010/0236297 A1* | 9/2010 | Ahn .................. D06F 37/304 310/43 |
| 2016/0244905 A1 | 8/2016 | Lv et al. |
| 2017/0268150 A1 | 9/2017 | Lv et al. |
| 2018/0355540 A1* | 12/2018 | Jeoung ................ D06F 37/04 |
| 2019/0186066 A1* | 6/2019 | Funakoshi ............ D06F 21/04 |
| 2020/0080246 A1* | 3/2020 | Miyake ................ H02K 21/12 |

FOREIGN PATENT DOCUMENTS

| | | |
|---|---|---|
| CN | 302924505 | 8/2014 |
| CN | 105780373 | 7/2016 |
| CN | 303888455 | 10/2016 |
| CN | 206219842 | 6/2017 |
| EP | 3453795 | 3/2019 |
| EP | 3470566 | 4/2019 |
| WO | 2015005752 | 1/2015 |
| WO | 2018133560 | 7/2018 |

* cited by examiner

DOUBLE-ROTOR WASHING TYPE DRUM WASHING MACHINE

CROSS-REFERENCE TO RELATED APPLICATION

This application claims priority to and the benefit under 35 U.S.C. § 119(e) of U.S. Provisional Patent Application No. 62/842,083, filed on May 2, 2019 entitled DOUBLE-ROTOR WASHING TYPE DRUM WASHING MACHINE, the entire disclosure of which is hereby incorporated herein by reference.

BACKGROUND OF THE DISCLOSURE

The device relates to the technical field of drum washing machines, in particular to a double-rotor washing type drum washing machine. The device also relates to a front-load laundry appliance having a dual-rotor motor for selective and independent operation of a rotating drum and a secondary clothes mover, such as an impeller or pulsator. Conventional drum washing machines have only one power system at work. When the laundry is washed, the inner tub rotates to drive the laundry and the water in the tub to rotate. The laundry is lifted and lowered by the rotation of the inner tub and the washboard in the tub. The laundry is broken up by the inner peripheral surface of the inner cylinder.

SUMMARY OF THE DISCLOSURE

According to one aspect of the present disclosure, a laundry appliance includes a drum that is rotationally operable about a rotational axis within a tub. The rotational axis is oriented in a generally horizontal configuration. An impeller is rotationally operable within the drum about the rotational axis. A dual-rotor motor is coupled to the drum and the impeller for providing separate and independent rotation of the drum and impeller about the rotational axis. An inner rotor of the dual-rotor motor is coupled with the impeller and an outer rotor of the dual-rotor motor is coupled with the drum.

According to another aspect of the present disclosure, a dual-rotor motor for a horizontal axis laundry appliance includes a stator having inner and outer poles that extend from a central core. Inner windings are disposed on the inner poles. Outer windings are disposed on the outer poles. An outer rotor is in electromagnetic communication with the outer windings. An inner rotor is in electromagnetic communication with the inner windings. An outer shaft extends between the outer rotor and a drum. An inner shaft that is positioned within the outer shaft and extending between the inner rotor and an impeller.

According to yet another aspect of the present disclosure, a laundry appliance includes a drum that is rotationally operable about a rotational axis within a tub. The rotational axis is oriented in a generally horizontal configuration. An impeller is rotationally operable within the drum about the rotational axis. A dual-rotor motor is coupled to the drum and the impeller for providing separate and independent rotation of the drum and the impeller about the rotational axis, the motor comprising a stator having inner and outer poles that extend from a central core. Inner windings are disposed on the inner poles. Outer windings are disposed on the outer poles. An outer rotor is in electromagnetic communication with the outer windings. An inner rotor is in electromagnetic communication with the inner windings. An outer shaft that extends between the outer rotor and the drum. An inner shaft is positioned within the outer shaft and extending between the inner rotor and the impeller.

The object of the present device is to provide a double-rotor washing drum washing machine that separately provides power for the washing inner tub and the washing pulsator. The performance of the double washing effect is accomplished by independent operation of the washing inner tub and the washing pulsator, thereby comprehensively improving the washing effect.

A double-rotor wash drum washing machine comprising an outer tub, a washing inner tub and a washing pulsator. The washing machine also includes a flange or shaft assembly and a drive motor. The flange or shaft assembly includes a hollow shaft, a hollow shaft bearing sleeved outside the middle portion of the hollow shaft and rotatably engaged with the hollow shaft, a solid shaft inserted through the hollow shaft, and a sleeve disposed outside the middle portion of the solid shaft and rotating with the solid shaft a solid shaft bearing; the hollow shaft bearing is embedded in a bearing seat fixedly coupled to the outer tub; the solid shaft bearing is embedded in the hollow shaft and connected to the inner wall of the hollow shaft. The drive motor includes a first rotor assembly, a stator assembly, and a second rotor assembly that are coaxially disposed in order from the outside to the inside. One end of the hollow shaft is connected to the first rotor assembly, and the other end is connected to a tripod mounted on the outer side of the rear wall of the washing tub; one end of the solid shaft is connected to the second rotor assembly, and the other end is connected to the washing pulsator.

Further, one end of the hollow shaft is splined to the first rotor assembly and fastened by a fastening nut.

Further, one end of the solid shaft is fixedly connected to the second rotor assembly by fastening bolts.

Further, an interference fit is formed between the solid shaft bearing and the hollow shaft.

Further, a hollow shaft water seal is disposed between the hollow shaft and the bearing housing.

Further, a solid shaft water seal is disposed between the solid shaft and the hollow shaft.

Further, the number of the solid shaft bearings is two, which are respectively sleeved on the outer sides of the two ends of the solid shaft middle section.

Further, the number of the hollow shaft bearings is two, which are respectively sleeved on the outer sides of the two ends of the middle portion of the hollow shaft.

The device relates to a double washing type drum washing machine, which comprises an outer tub, a washing inner tub, a washing pulsator, a flange assembly and a driving motor. The flange assembly includes a hollow shaft, a hollow shaft bearing, a solid shaft, and a solid shaft bearing. The hollow shaft bearing is embedded in a bearing housing fixedly connected to the outer tub. The solid shaft bearing is embedded in the hollow shaft and connected to the inner wall of the hollow shaft. The drive motor includes a rotor assembly, a stator assembly, and a rotor assembly that are coaxially disposed in order from the outside to the inside. One end of the hollow shaft is connected to the rotor assembly, and the other end is connected to a tripod mounted on the outside of the rear wall of the washing tub. One end of the solid shaft is connected to the rotor assembly, and the other end is connected to the washing wheel. The device can separately provide power for the washing inner tub and the washing pulsator, and double washing by independent operation of the washing inner tub and the washing pulsator to comprehensively improve the washing effect.

A double-washing drum washing machine includes an outer tub, a washing inner tub and a washing pulsator, a flange assembly and a driving motor. The flange assembly includes a hollow shaft, a hollow shaft bearing sleeved outside the middle portion of the hollow shaft and rotatably engaged with the hollow shaft, a solid shaft inserted through the hollow shaft, and a sleeve disposed outside the middle portion of the solid shaft and rotating with the solid shaft a solid shaft bearing. The hollow shaft bearing is embedded in a bearing seat fixedly connected to the outer tub. The solid shaft bearing is embedded in the hollow shaft and connected to the inner wall of the hollow shaft. The drive motor includes a first rotor assembly, a stator assembly and a second rotor assembly that are coaxially disposed from the outside to the inside. One end of the hollow shaft is connected to the first rotor assembly, and the other end is connected to a tripod mounted on the outer side of the rear wall of the washing tub. One end of the solid shaft is connected to the second rotor assembly, and the other end is connected to the washing wheel.

It can be seen from the above technical solutions that the present device can separately provide power for the washing inner tub and the washing pulsator, and performs double washing by independent operation of the washing inner tub and the washing pulsator, thereby comprehensively improving the washing effect.

DETAILED DESCRIPTION

Figure 1:
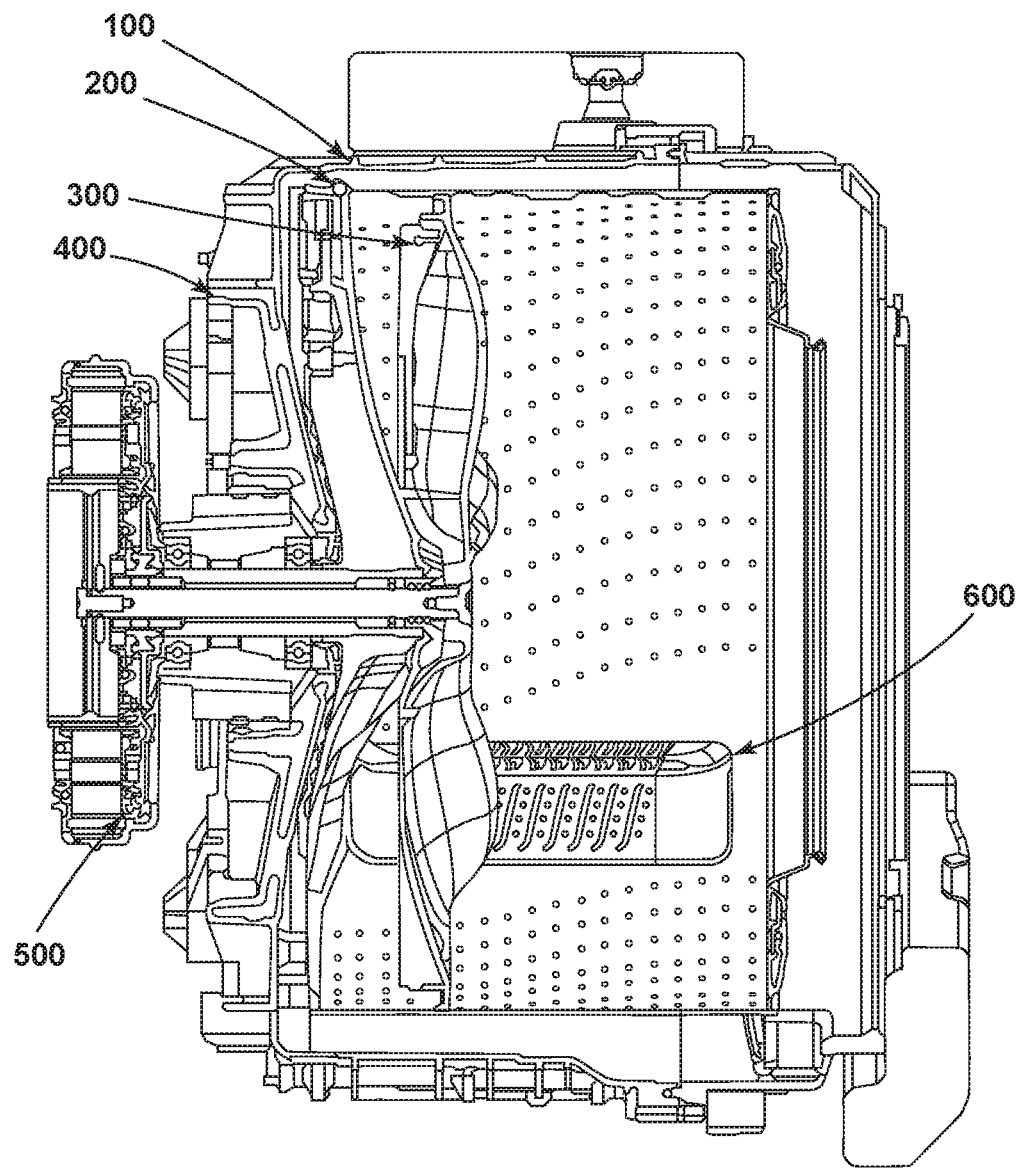
FIG. 1 is a schematic cross-sectional view of the structure of the present device.
Figure 2:
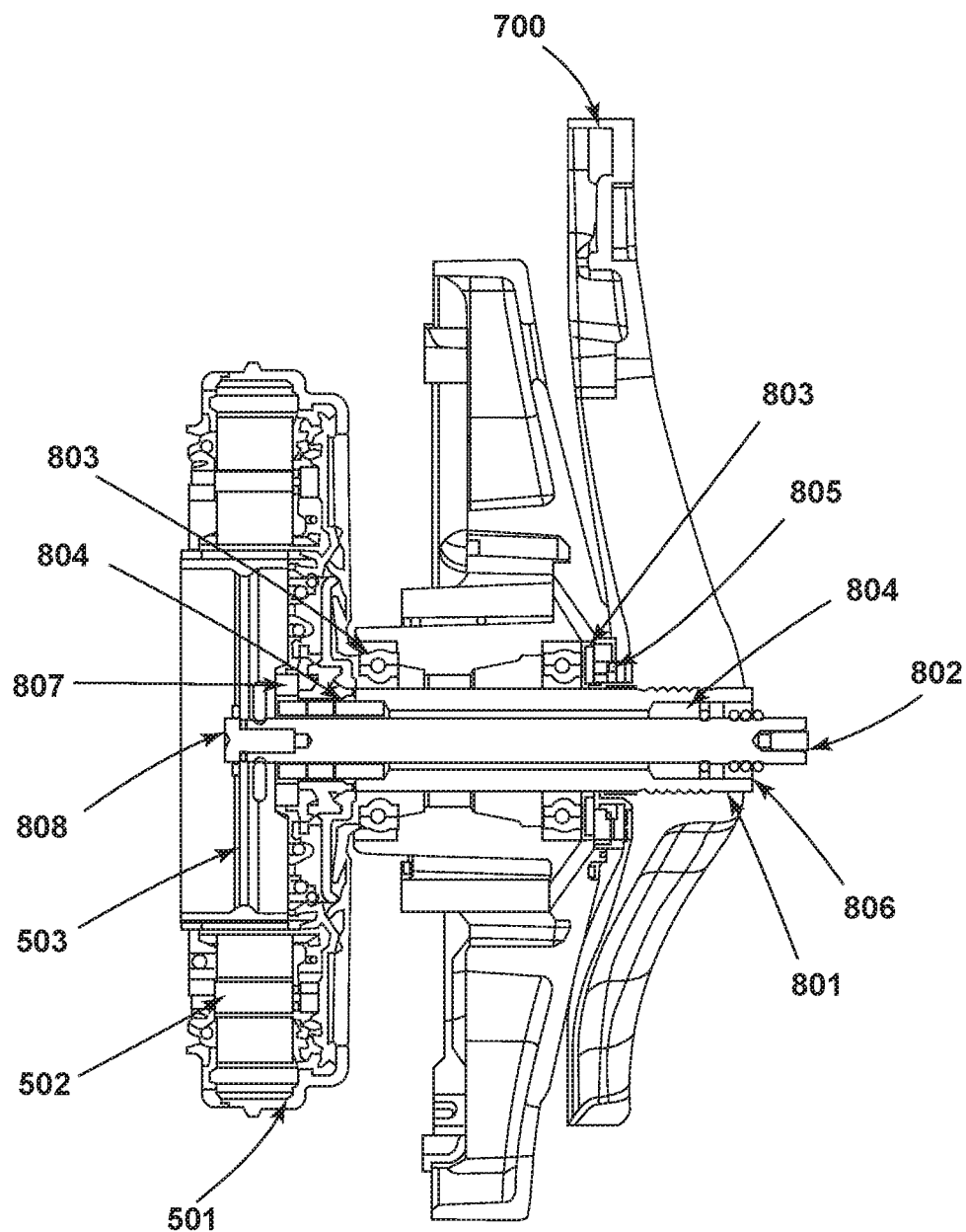
FIG. 2 is a schematic cross-sectional view showing the assembly structure of the shaft assembly and the drive motor assembly.
Figure 3:
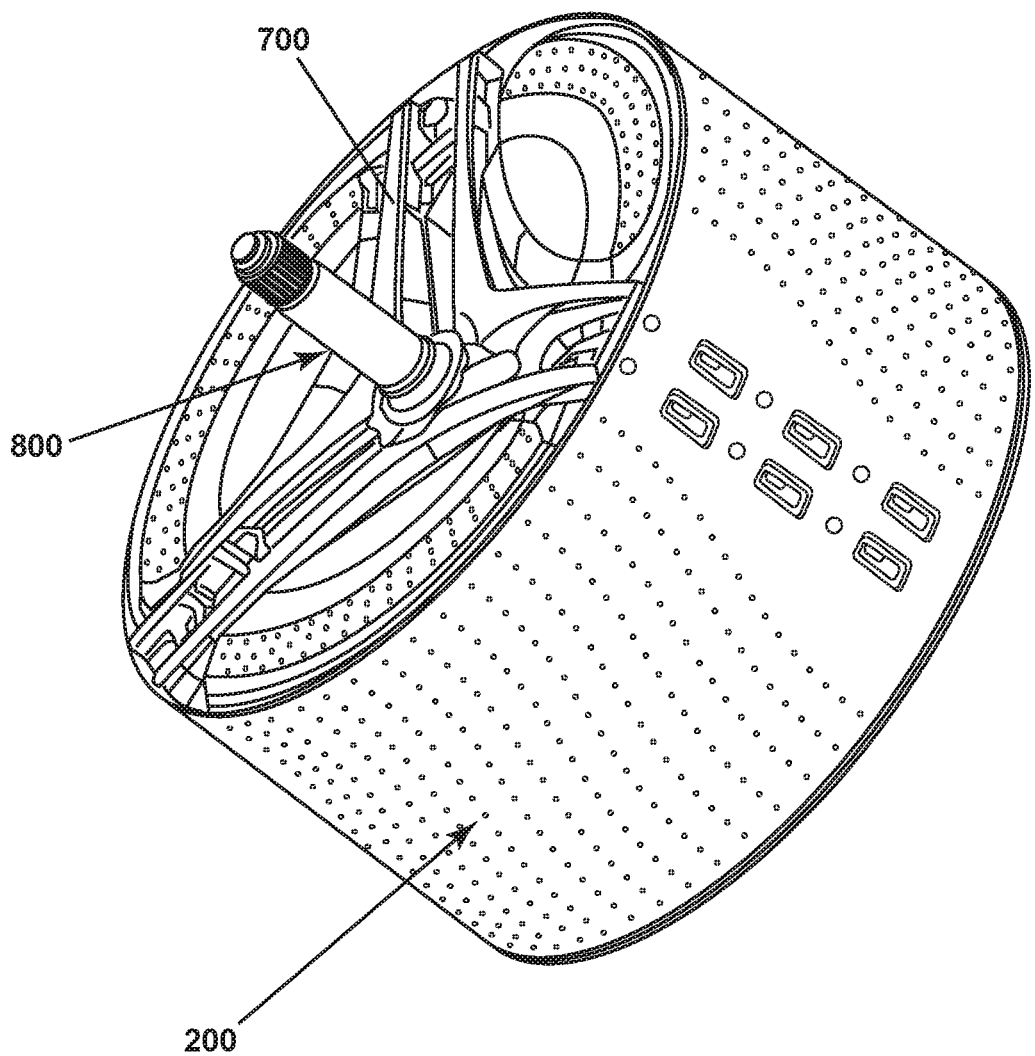
FIG. 3 is a perspective view showing the assembly structure of the shaft assembly and the washing inner tub.
Figure 4:
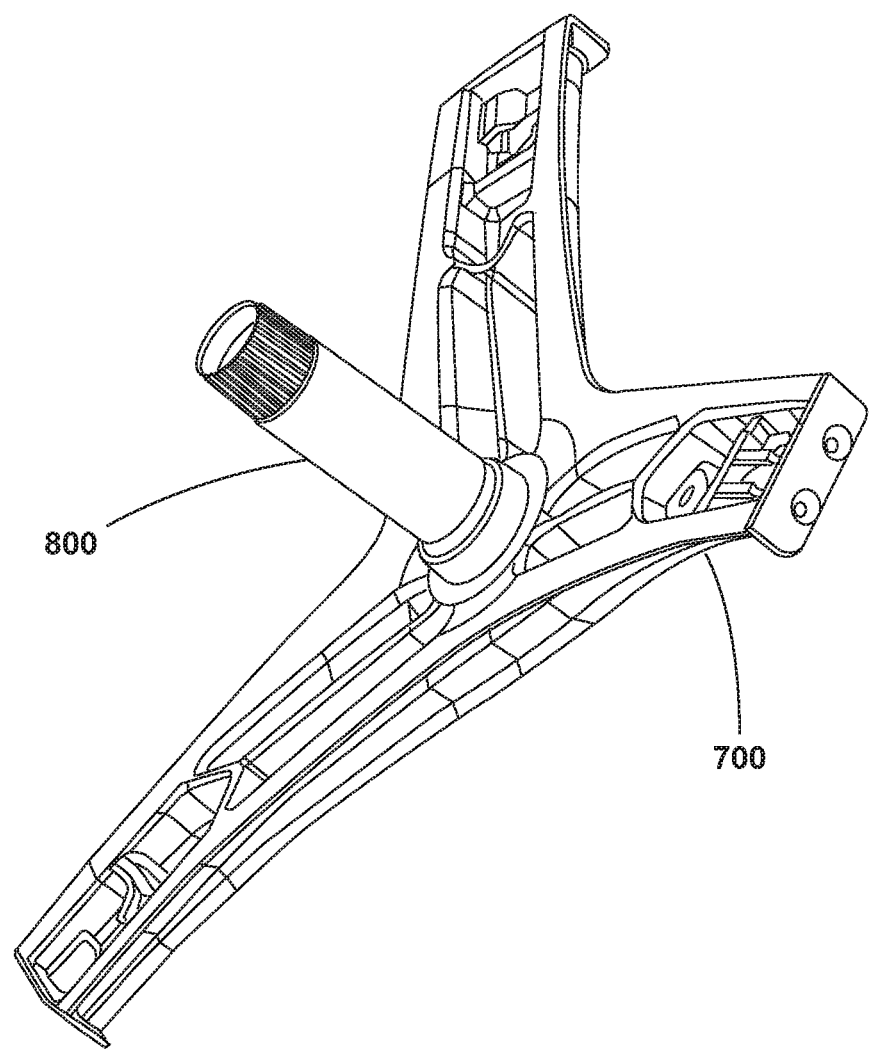
FIG. 4 is a perspective view showing the assembly structure of the shaft assembly and the tripod.
Figure 5:
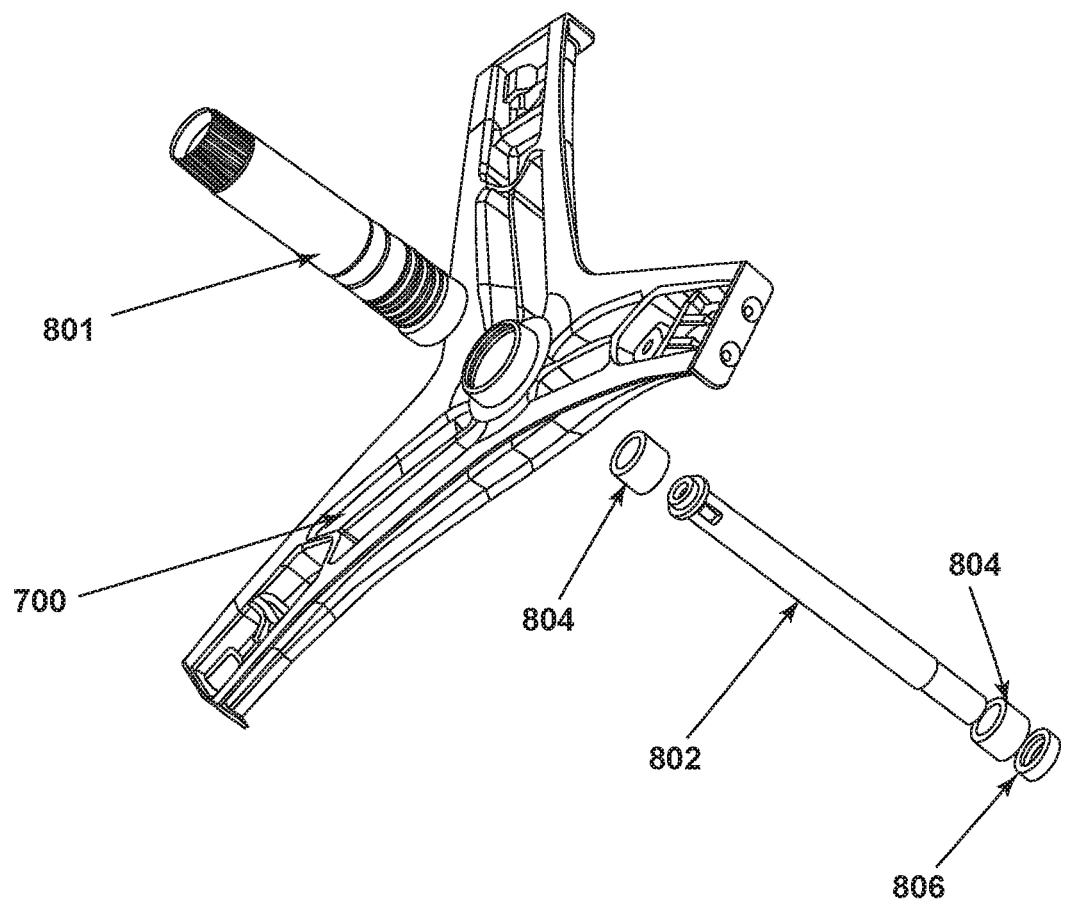
FIG. 5 is an exploded perspective view of the assembly structure of the shaft assembly and the tripod.

The present illustrated embodiments reside primarily in combinations of method steps and apparatus components related to a double rotor horizontal axis front-load laundry appliance that includes an outer rotor for operating a rotating drum and an inner rotor for rotating a pulsator within the drum, and wherein the inner and outer rotors are separately and independently operable relative to one another. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The present device will be further described below in conjunction with the accompanying drawings:

Referring to FIGS. 1-6, an aspect of the double-rotor wash drum washing machine includes an outer tub 100, a washing inner tub 200, and a washing pulsator 300. The washing machine also includes a shaft assembly 800 and a drive motor 500. The shaft assembly 800 includes a hollow shaft 801, a hollow shaft bearing 803 sleeved outside the middle portion of the hollow shaft 801 and rotatably engaged with the hollow shaft 801, a solid shaft 802 is penetratingly mounted in the hollow shaft 801, and a sleeve is mounted on the solid shaft 802. A solid shaft bearing 804 on the outer side of the middle portion and is rotatably engaged with the solid shaft 802. The hollow shaft bearing 803 is embedded in a bearing housing 400 fixedly coupled to the outer tub 100. The solid shaft bearing 804 is embedded in the hollow shaft 801 and is connected to the inner wall of the hollow shaft 801. The hollow shaft 801 can be die-cast integrally with a tripod 700 by a die-casting mold. The washing pulsator 300 is installed in the washing inner tub 200, and the washing inner tub 200 is further provided with a washboard 600.

Figure 6:
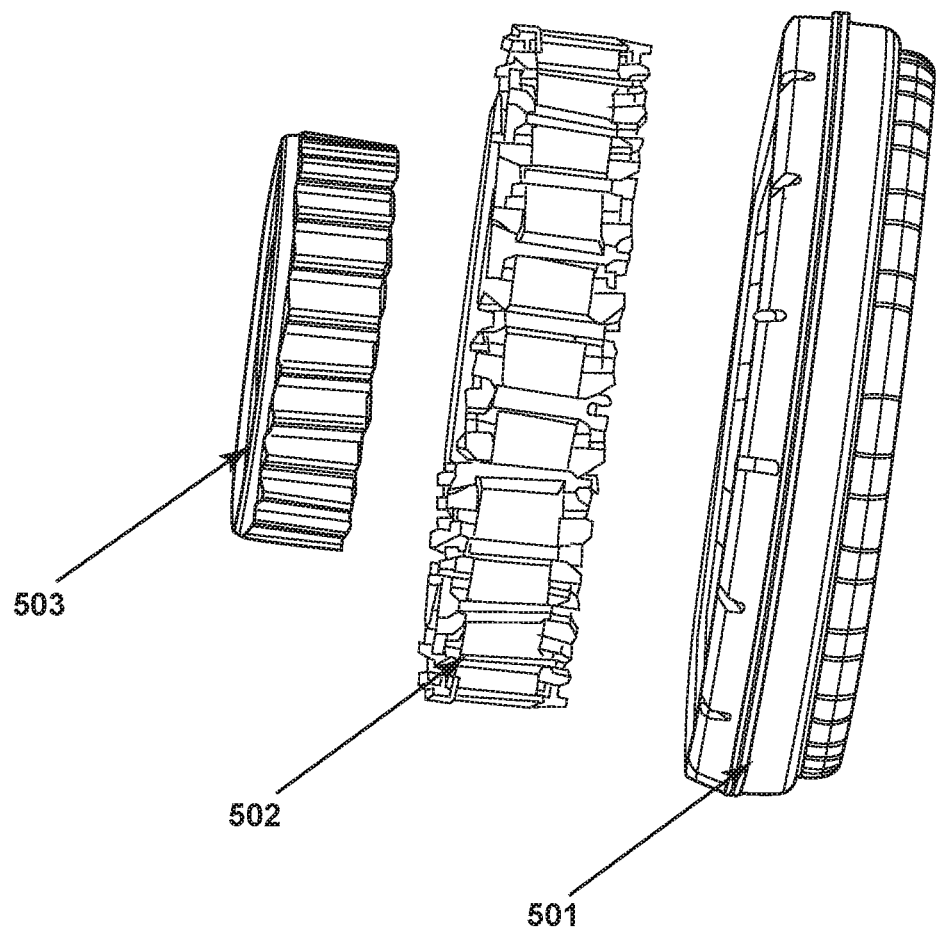
FIG. 6 is an exploded perspective view of the drive motor assembly.
Figure 7:
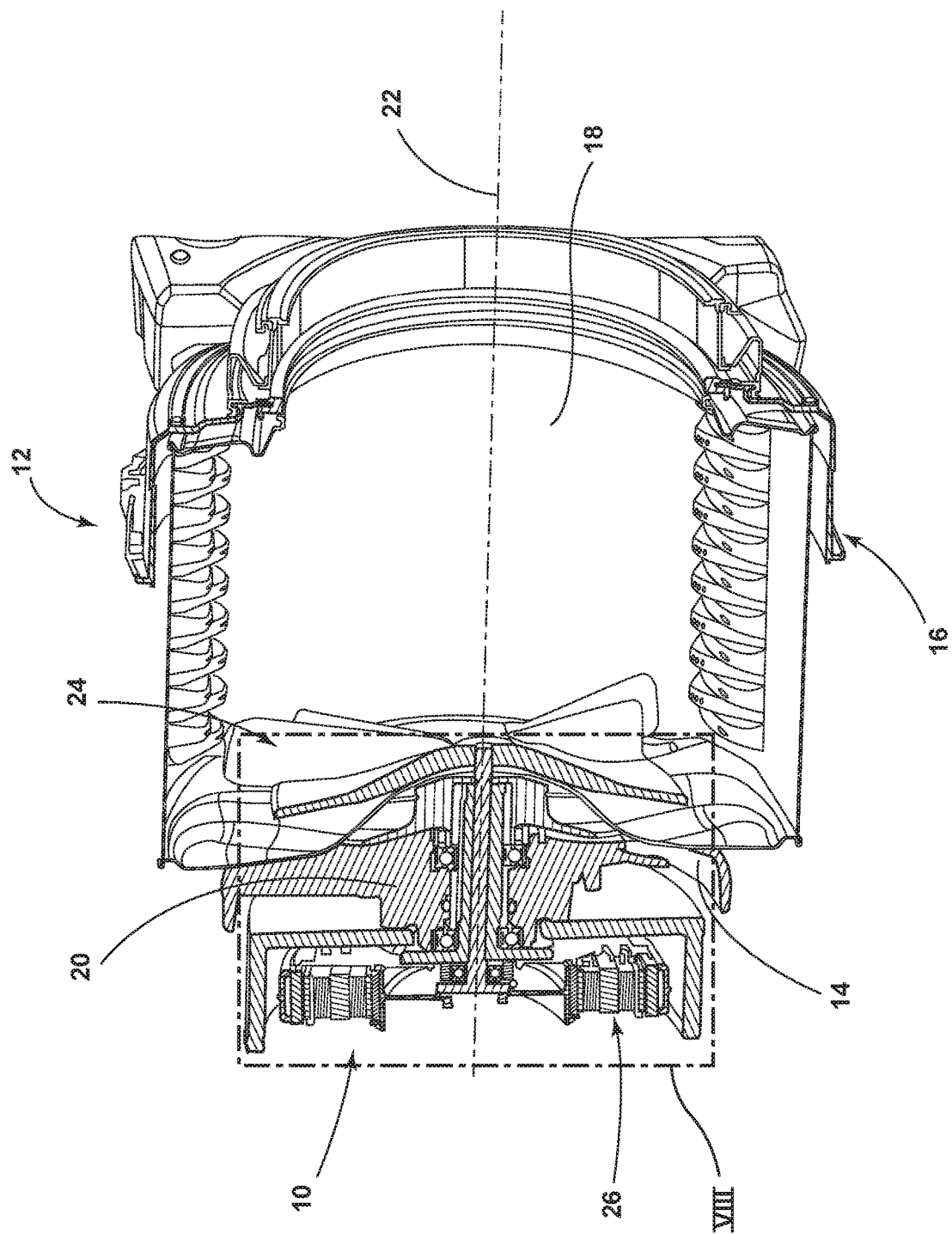
FIG. 7 is a cross-sectional perspective view of a front-load washing appliance that incorporates a dual-rotor motor for independently operating a rotating drum and a pulsator.
Figure 8:
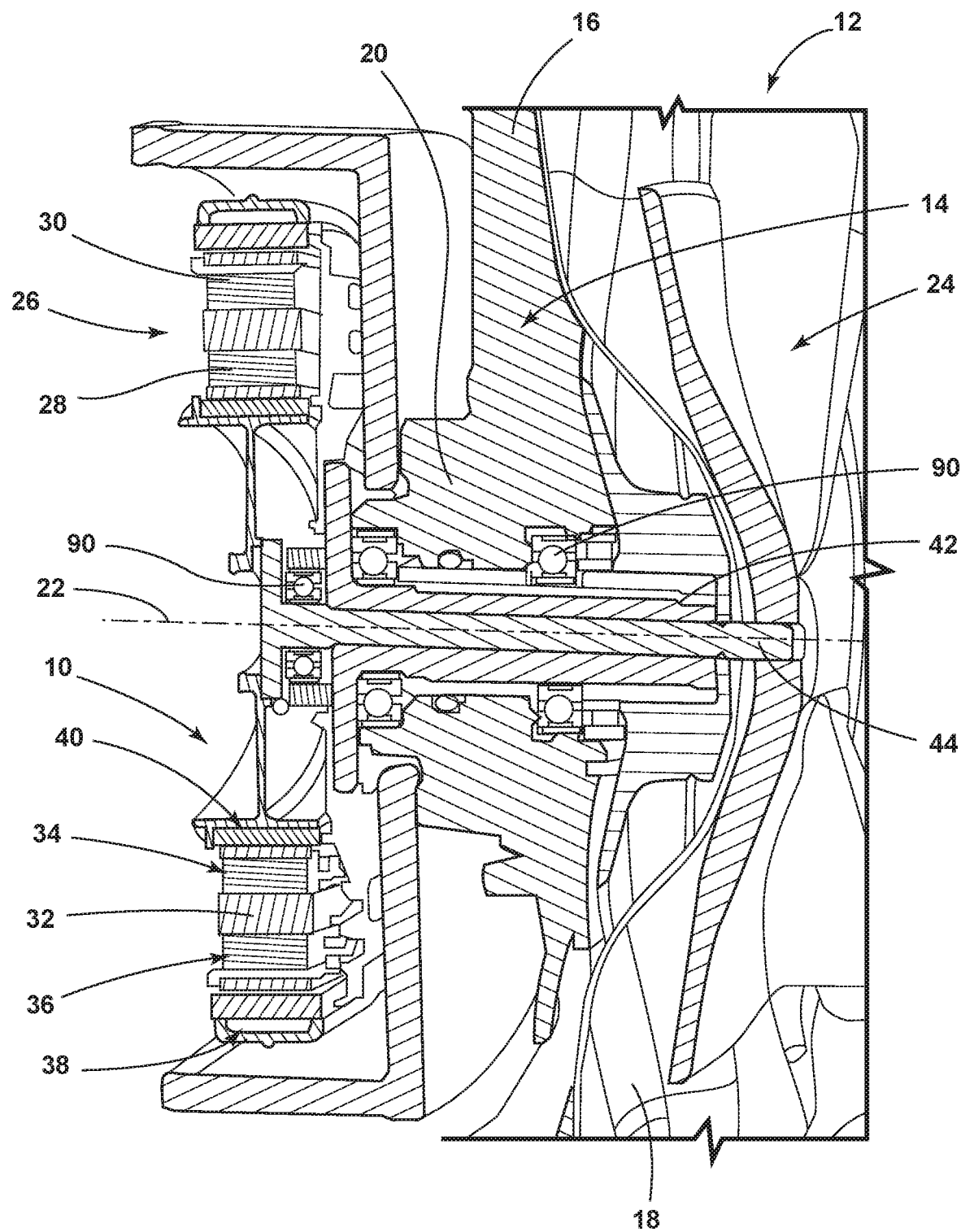
FIG. 8 is an enlarged cross-sectional perspective view of the laundry appliance of FIG. 7 taken at area VIII.
Figure 9:
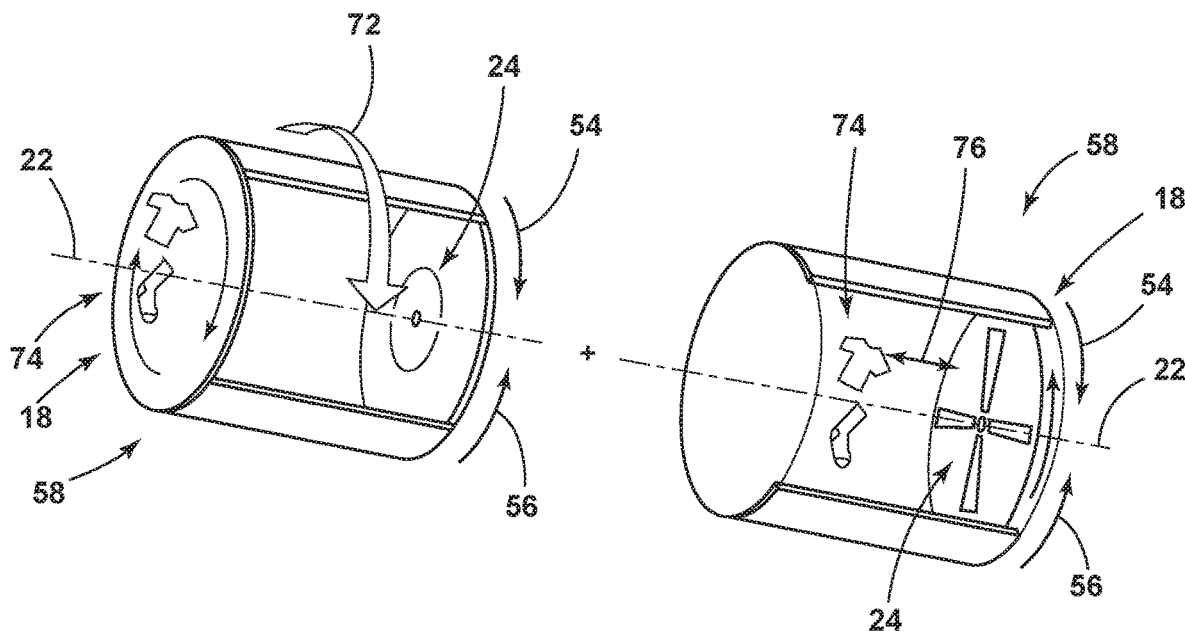
FIG. 9 is a schematic diagram illustrating combined and independent operation of the drum and pulsator for promoting rotational and axial movement of laundry within the rotating drum relative to a rotational axis of the drum.
Figure 10:
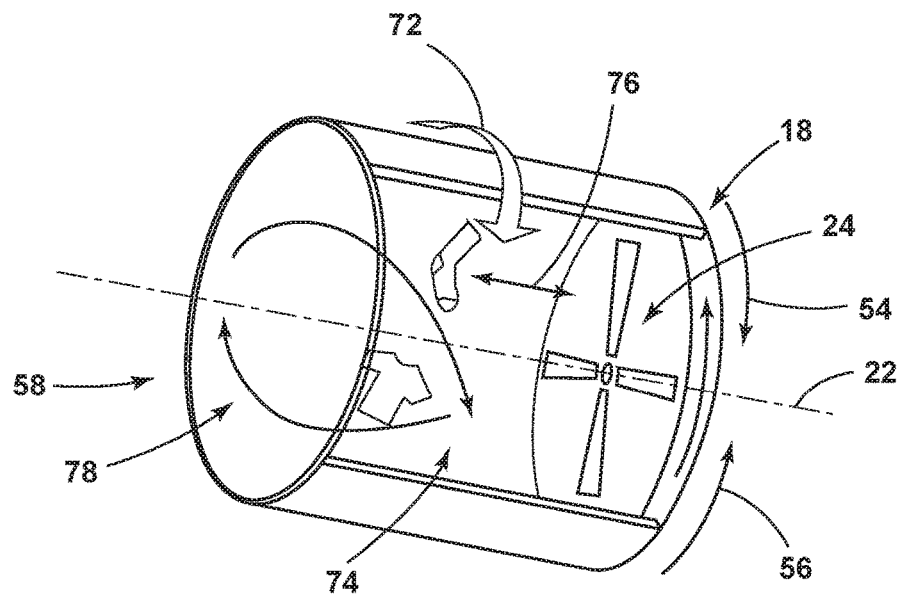
FIG. 10 is a schematic diagram illustrating a dynamic helical agitating pattern of laundry within the rotating drum.

As shown in FIG. 6, the drive motor 500 includes a first rotor assembly 501, a stator assembly 502, and a second rotor assembly 503 that are coaxially disposed in order from the outside to the inside. The first rotor assembly 501 and the second rotor assembly 503 are respectively adapted to the stator assembly 502, and the first rotor assembly 501 and the second rotor assembly 503 are independently rotated relative to the stator assembly 502, respectively.

One end of the hollow shaft 801 is connected to the rotor assembly 501, and the other end is connected to a tripod 700 mounted on the outer side of the rear wall of the washing inner tub 200. One end of the solid shaft bearing 804 is connected to the rotor assembly 503, and the other end is connected to the washing wheel.

As exemplified in FIG. 6, one end of the hollow shaft 801 is splined to the first rotor assembly 501 and fastened by a fastening nut 807, a screw or other similar fastener. Under the driving of the stator assembly 502, the first rotor assembly 501 rotates, thereby driving the hollow shaft 801 to rotate, and the hollow shaft 801 drives the washing inner tub 200 connected thereto to rotate.

In various aspects of the device, one end of the solid shaft 802 is fixedly connected to the rotor assembly 503 by a fastening bolt 808. Under the driving of the stator assembly 502, the rotor assembly 503 rotates, thereby driving the solid shaft 802 to rotate, and the solid shaft 802 drives the washing pulsator 300 connected thereto to rotate. The solid shaft bearing 804 has an interference fit with the hollow shaft 801. The solid shaft bearing 804 fixes the solid shaft 802 in the middle of the hollow shaft 801.

Referring again to FIGS. 1-6, a hollow shaft water seal 805 is disposed between the hollow shaft 801 and the bearing housing 400. The hollow shaft water seal 805 is for preventing water from entering the bearing housing 400 and protecting the bearing housing 400. A solid shaft water seal 806 is disposed between the solid shaft 802 and the hollow shaft 801. The solid shaft water seal 806 is for preventing water in the washing machine from entering between the solid shaft 802 and the hollow shaft 801, and protecting the solid shaft 802 and the hollow shaft 801. The number of the solid shaft bearings 804 is typically two. The solid shaft bearings 804 are respectively sleeved on the outer sides of the two ends of the middle portion of the solid shaft 802. The solid shaft bearing 804 functions to support and fix the solid shaft 802. A solid shaft bearing 804 is respectively disposed at both ends of the middle portion of the solid shaft 802 to ensure the stability of the solid shaft 802.

As exemplified in FIGS. 1-6, the number of the hollow shaft bearings 803 is typically two, which are respectively sleeved on the outer sides of the two ends of the middle portion of the hollow shaft 801. The hollow shaft bearing 803 functions to support and fix the hollow shaft 801. A hollow shaft bearing 803 is respectively disposed at both ends of the middle portion of the hollow shaft 801 to ensure the stability of the hollow shaft 801. The hollow shaft bearing 803 is embedded in the middle of the bearing housing 400, and the hollow shaft 801 passes through the two hollow shaft bearings 803, which is equivalent to the hollow shaft 801 being mounted on the bearing housing 400. The bearing housing 400 is mounted outside the rear wall of the outer tub 100.

According to various aspects, the present device realizes two independent power sources by providing a coaxially assembled solid shaft 802 and a hollow shaft 801, and adopting two rotor assemblies to share the stator assembly 502, thereby obtaining an independent washing inner tub 200 and washing pulsator 300, respectively. Under the action of the stator assembly 502, the first rotor assembly 501 rotates to drive the hollow shaft 801 to rotate, thereby driving the washing inner tub 200 connected to the hollow shaft 801 to rotate. Under the action of the stator assembly 502, the second rotor assembly 503 rotates to drive the solid shaft 802, thereby driving the washing wheel connected to the solid shaft 802 to rotate. These two parts can be used alone or in combination. When combined, they can be rotated in the same direction or in the opposite direction. The driving motor used in the device can integrate multiple power systems into a common space, has a compact overall structure, takes up less space, and can reduce the manufacturing difficulty of manufacturing and assembly due to the lack of a clutch shifting mechanism, and avoids clutch transmission, energy loss and noise.

The present device can be said that the washing inner tub 200 and the washing pulsator 300 simultaneously or separately provide power, and the double washing of the washing pulsator 300 and the washboard 600 provided on the inner wall of the washing inner tub 200 can be realized, thereby comprehensively improving the washing effect. The device can provide the user with a variety of laundry modes by the combination of the washing pulsator 300 and the washing inner tub 200, which can effectively enhance the falling and stirring degree of the laundry and improve the washing performance. At the same time, it also improves the turning and correcting ability of the washing machine, reduces the amount of electricity and water consumption, and improves the washing effect and dewatering effect.

Referring now to FIGS. 8 and 16-22, which incorporate separate reference numerals, reference numeral 10 generally refers to a dual-rotor motor that is incorporated within a laundry appliance 12, typically a front-load laundry appliance. The dual-rotor motor 10 can be coupled to a rear wall 14 of the tub 16 that houses the rotating drum 18, where the dual-rotor motor 10 is attached to a structural hub 20 that is attached to or disposed within the rear wall 14 of the tub 16. According to various aspects of the device, the laundry appliance 12 includes the drum 18 that is rotationally operable about a rotational axis 22 within the tub 16. The rotational axis 22 is oriented in a generally horizontal configuration. It should be understood that an angular configuration is also contemplated for use within respect to the front-load appliance 12. A pulsator, impeller or other secondary clothes mover 24 is rotationally operable within the drum 18 about the rotational axis 22. The dual-rotor motor 10 is coupled to the drum 18 and the secondary clothes mover 24 for providing separate and independent rotation of the drum 18 and the secondary clothes mover 24 about the rotational axis 22.

Referring again to FIGS. 7-12 and 16-22, the dual-rotor motor 10 includes a stator 26 having inner poles 28 and outer poles 30 that extend outward from a central core 32, typically a unitary core. Inner windings 34 are disposed on a plurality of inner teeth to form the inner poles 28 and outer windings 36 are disposed on a plurality of outer teeth to form the outer poles 30. The stator 26, including the inner and outer poles 28, 30 and the inner and outer windings 34, 36 can be overmolded as a single stator assembly that can be coupled with the tub 16, the hub 20, or both. An outer rotor 38 is placed in electromagnetic communication with the outer windings 36 and an inner rotor 40 is placed in electromagnetic communication with the inner windings 34. An outer shaft 42 extends between the outer rotor 38 and the drum 18 and an inner shaft 44, that is positioned within the outer shaft 42, extends between the inner rotor 40 and the secondary clothes mover 24. It is contemplated that the central core 32 of the stator 26 can be formed using various manufacturing techniques. These techniques can include, but are not limited to, helically winding the central core 36, laminating plates to form the central core 36, combining segments to form the central core 36, combinations thereof, and other similar techniques. It is also contemplated that the inner and outer teeth of the inner and outer poles 28, 30 can be integrally formed as part of the central core 36 or can be attached thereto after formation of the central core 36. It is also contemplated that one of the inner and outer teeth can be integral and the other of the inner and outer teeth can be attached to the central core 36.

According to various aspects of the device, as exemplified in FIGS. 11-22, the inner and outer windings 34, 36 of the dual-rotor motor 10 are separately coupled to dedicated power modules. The dedicated power modules include a first power module 46 that selectively delivers a first electrical current 48 to the outer windings 36 and a second power module 50 that selectively delivers a second electrical current 52 to the inner windings 34. Operation of the first and second power modules 46, 50 is independent from one another so that the first and second electrical currents 48, 52 can be independently and selectively delivered to the respective outer and inner windings 36, 34. Through this configuration, the drum 18 can rotate about the rotational axis 22 in clockwise and counterclockwise directions 54, 56 and also at a variety of rotational speeds. Separately and independently, the secondary clothes mover 24 can also rotate in clockwise and counterclockwise directions 54, 56 and in a variety of rotational speeds about the rotational axis 22 in a manner that is independent of the rotating drum 18. Using the first and second power modules 46, 50 that are independently operated, a wide range of agitating patterns 58 can be defined through independent operation of the rotating drum 18 and the secondary clothes mover 24.

The secondary clothes mover 24 can include a variety of dimensional variations. In certain aspects, the secondary clothes mover 24 can include a diameter that is significantly smaller than the diameter of the drum 18. In other aspects of the device, as exemplifies in FIG. 22, the secondary clothes mover 24 can have a diameter that is similar to that of the diameter of the drum 18. In such an embodiment, the secondary clothes mover 24 can appear to define the back wall 166 of the drum 18. This configuration has the appearance of the sidewall 164 of the drum 18 operating independent of the back wall 166 of the drum 18. The drum 18 can include a back rim 160 that attaches with a cross piece 162 or other similar structure that extends from the back rim 160 of the drum 18 to the outer shaft 42. The secondary clothes mover 24 can be positioned in front of the back rim 160 and the cross piece 162. The back rim 160 can be attached to the sidewall 164 of the drum 18 and the secondary clothes mover 24, which is coupled to the inner shaft 44, appears to define the back wall 166 of the drum 18.

As exemplified in FIGS. 7-14, the outer rotor 38, which is connected to the rotating drum 18, is operable in clockwise and counterclockwise directions 54, 56 and in a variety of rotational speeds to result in a similar operability of the rotating drum 18. Likewise, the inner rotor 40 is independently operable to rotate the clockwise and counterclockwise directions 54, 56 about the rotational axis 22 and also at a wide range of rotational speeds. This functionality of the inner and outer rotors 40, 38, which are placed in electromagnetic communication with the inner and outer windings 34, 36, respectively, can be operated through a controller 70 that is placed in communication with the first and second power modules 46, 50.

It is contemplated that a single controller 70 can be used to operate each of the first and second power modules 46, 50. Alternatively, separate controllers 70 can be utilized. Where separate controllers 70 are used, a certain amount of cooperation may be required among the separate controllers 70 for controlling the timing of the operation of the drum 18 and the timing of the operation of the secondary clothes mover 24, with respect to one another.

Referring again to FIGS. 7-14, operation of the inner and outer rotors 40, 38 can be conducted without the use of a position sensor that determines a repeatable home position of the inner and outer rotors 40, 38. Through this "sensorless" configuration, each of the inner and outer rotors 40, 38 can start rotation from any rotational position relative to the stator 26.

While a "sensorless" configuration is disclosed herein, certain aspects of the device can include one or more positioning sensors for determining a home position of one or both of the inner and outer rotors 40, 38. This home position can be used for providing a consistent start position of one or both of the inner and outer rotors 40, 38 with respect to the stator 26.

Referring now to FIGS. 9-10 and 13-14, operation of the rotating drum 18 and the outer rotor 38 typically results in a rotational component 72 of an agitating pattern 58 for processing a load of laundry 74 within the rotating drum 18. This rotational component 72 of the agitating pattern 58 can be supplemented through operation of the secondary clothes mover 24. As discussed above, the secondary clothes mover 24 is separately and independently operable through operation of the inner rotor 40 of the dual-rotor motor 10. The addition of the motion of the secondary clothes mover 24 within the rotating drum 18 can result in an axial component 76 of an agitating pattern 58 for the rotating drum 18. The combination of the rotational component 72 of the drum 18 and the axial component 76 of the secondary clothes mover 24 can result in a helical-type agitating pattern 78 within the drum 18. This helical-type agitating pattern 78 can result in a more thorough and efficient wash cycle of laundry within the appliance 12. This, in turn, can result in shorter wash times and a savings of energy within each wash cycle and over the life of the appliance 12.

As discussed above, the front-load appliance 12 that incorporates the dual-rotor motor 10 can include a rotational axis 22 that is positioned at an angle with respect to a horizontal plane. In such an embodiment, the secondary clothes mover 24 can produce an axial motion of a load of laundry 74 away from a rear wall 14 of the tub 16. This axial component 76 can work in combination with a force of gravity that tends to push the load of laundry 74 back toward the rear wall 14 of the tub 16. Through operation of the secondary clothes mover 24, the load of laundry 74 can be moved in an axial motion toward and away from the rear wall 14 of the tub 16. This motion further promotes the helical-type agitating pattern 78 that can be utilized within the front-load washing appliance 12.

Referring now to FIGS. 7-8 and 16-18, the outer rotor 38 of the dual-rotor motor 10 can be attached to a hollow outer shaft 42 that extends between the rotating drum 18 and the outer rotor 38. Within the hollow outer shaft 42, a solid inner shaft 44 or a substantially solid inner shaft 44 can extend between the inner rotor 40 and the secondary clothes mover 24. Various bearings 90 are positioned between the inner shaft 44 and the hollow outer shaft 42 and between the hollow outer shaft 42 and a structural hub 20 that is coupled within the tub 16 for the laundry appliance 12. Through this configuration, the outer rotor 38 can operate the rotating tub 16 in an independent and selective rotational pattern separate from the operation of the inner rotor 40 and the secondary clothes mover 24 for the laundry appliance 12. While the inner shaft 44 is described herein as solid or substantially solid, it should be understood that the inner shaft 44 may include a hollow tube that is positioned within the hollow outer shaft 42. Using a hollow inner shaft 44, this space within the inner shaft 44 may be used for the delivery of material and resources between the drum 18 or tub 16 and areas outside of the drum 18 and tub 16.

The use of the bearings 90 between the hub 20 of the tub 16 and the hollow outer shaft 42 and between the hollow outer shaft 42 and the solid inner shaft 44 can be at least partially sealed to prevent infiltration of fluid between these rotating components that are positioned at the rotational axis 22 of the drum 18. Additionally, various fastening features can extend between the rotor and the structural hub 20 coupled with the tub 16. These fastening features can include various bosses, bolts, overmolds, and other similar fastening features that can be used to securely attach the stator 26 to the hub 20 that is positioned in or otherwise attached to the rear wall 14 of the tub 16 for the front-load washing appliance 12. The location of the bearings 90 with respect to the inner shaft 44, the outer shaft 42 and the hub 20 may be located in various axial positions along the rotational axis 22.

According to various aspects of the device, as exemplified in FIGS. 7-8 and 16-21, the stator 26 for the dual-rotor motor 10 and the inner and outer poles 28, 30 can be made through various methods. Such manufacturing methods can include, but are not limited to, stacked laminations, assembled sectional components, a stator 26 that includes a helically-wound configuration, a stator 26 that utilizes combinations of these assembly methods, and other similar assembly methods for forming the stator 26 for the dual-rotor motor 10.

According to various aspects of the device, as exemplified in FIGS. 1-21, the stator 26 for the dual-rotor motor 10 can include a single stator 26 that includes opposing inner and outer poles 28, 30. In various aspects of the device, the stator 26 can include an inner stator assembly 150 that is in electromagnetic communication with the inner rotor 40, and a separate outer stator assembly 152 that is in electromagnetic communication with the outer rotor 38. In such an embodiment, as shown in FIG. 21 as a non-limiting example, the inner stator assembly 150 includes the inner windings 34 and the outer stator assembly 152 includes the outer windings 36. Each of the inner and outer stator assemblies 150, 152 are separately wound and separately overmolded as distinct assemblies. These distinct assemblies can be separately attached to the tub 16 or the hub 20, or both. The inner and outer stator assemblies 150, 152 may also be attached as part of a single or cooperative attachment structure.

Figure 11:
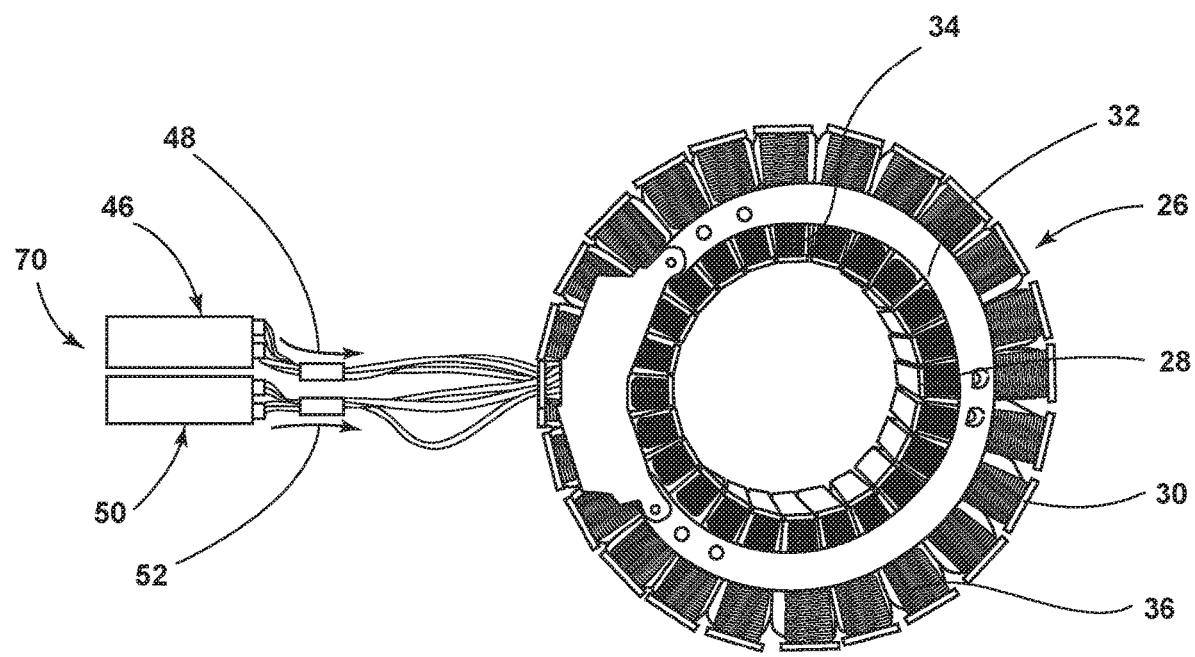
FIG. 11 is a top perspective view of the stator for the dual-rotor motor having inner and outer stator poles.
Figure 12:
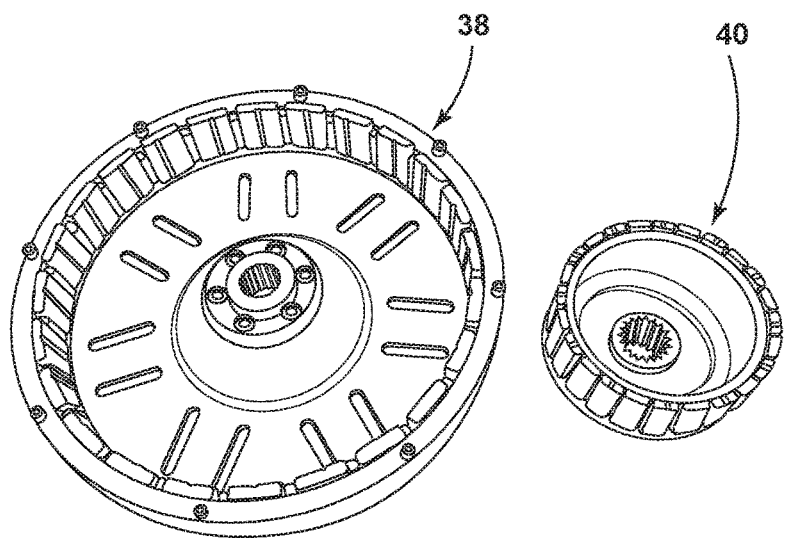
FIG. 12 is a top perspective view of an aspect of the inner rotor and outer rotor positioned next to one another.

As exemplified in FIG. 11, the number of inner poles 28 can match the number of outer poles 30. It should be understood that the number of inner poles 28 and the number of outer poles 30 may be dissimilar, depending upon the particular design of the appliance 12. Additionally, the size of the inner poles 28 and the size of the outer poles 30 can be the same or can be dissimilar. Again, variations and these dimensional and numerical tolerances can depend upon the particular design of the appliance 12 and the power needs for operating the outer rotor 38 and the inner rotor 40.

According to various aspects of the device, the use of the dual-rotor motor 10 within the front-load appliance 12 provides an improved performance when compared to conventional appliances 12. This improved performance includes better sound performance where the noise produced by the dual-rotor motor 10 having the independently operable outer and inner rotors 38, 40 produces a much quieter operation during various operating cycles. The use of the dual-rotor motor 10 provides a direct-drive motor within the appliance 12 that does not include gearing, belt-drive mechanisms, or other similar rotational transfer mechanisms that are often utilized in conventional appliances 12.

Additionally, the use of the separate power modules or inverters provides for independent and selective operation of the outer rotor 38 and inner rotor 40 for operating the drum 18 and secondary clothes mover 24, respectively. These first and second power modules 46, 50 or inverters can be placed upon a common power board for the appliance 12. It is also contemplated that separate power boards can be used for housing the first and second power modules 46, 50 for operating the outer rotor 38 and the inner rotor 40 for the dual-rotor motor 10.

As discussed above, the outer rotor 38 of the dual-rotor motor 10 is typically coupled to the outer drum 18 and the inner rotor 40 is typically coupled to the secondary clothes mover 24. In various aspects of the device, this configuration can be switched where the inner rotor 40 operates the rotating drum 18 and the outer drum 18 operates the secondary clothes mover 24. The configuration of the outer rotor 38 and inner rotor 40, with respect to the drum 18 and secondary clothes mover 24, depends upon the particular design needs of the particular appliance 12.

Typically, within a front-load appliance 12, greater power needs and torque are needed for operating the rotating drum 18, as compared to the power needs and torque necessary for operating the secondary clothes mover 24. Accordingly, it is typical that the outer rotor 38 is utilized for rotating the drum 18 as the outer rotor 38 is typically able to provide a greater rotational force, when compared to the inner rotor 40. It should be understood that the number and size of the poles and windings can be adjusted to provide a more equalized or more differentiated torque between the inner and outer rotor 40, 38. The size of windings and the amount of electrical current delivered to the inner and outer windings 34, 36 can also be adjusted to equalize or distinguish the torque between the inner and outer rotor 40, 38. These modifications can also provide a dual-rotor motor 10 where the inner rotor 40 can provide a greater amount of torque than the outer rotor 38.

Figure 13:
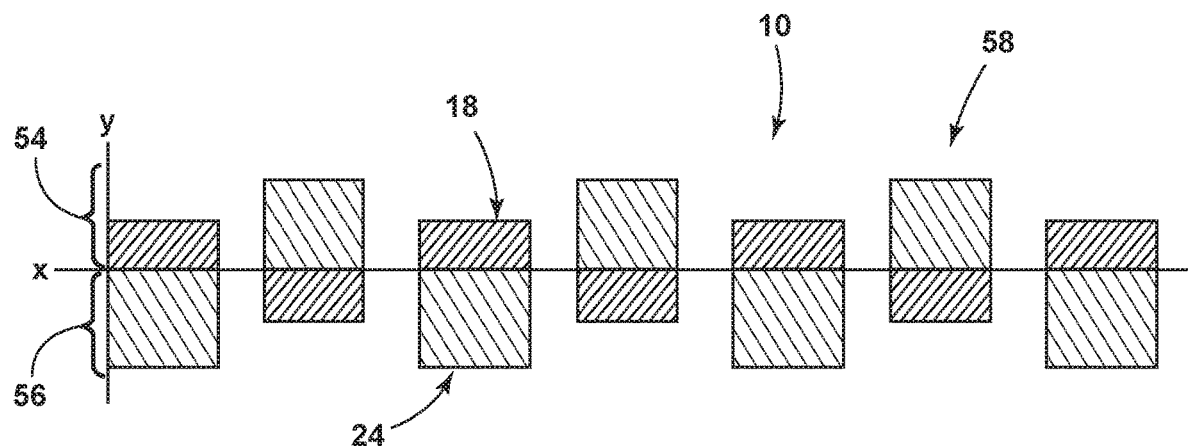
FIG. 13 is a schematic diagram illustrating combined and independent operation of the inner and outer rotors for operating the rotating drum and the secondary clothes mover.
Figure 14:
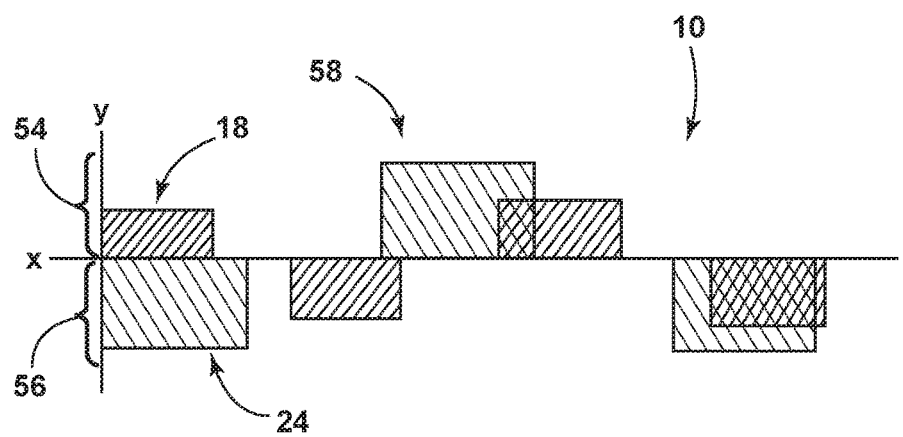
FIG. 14 is a schematic diagram illustrating another pattern of operation of the inner and outer rotors for the dual-rotor motor.
Figure 15:
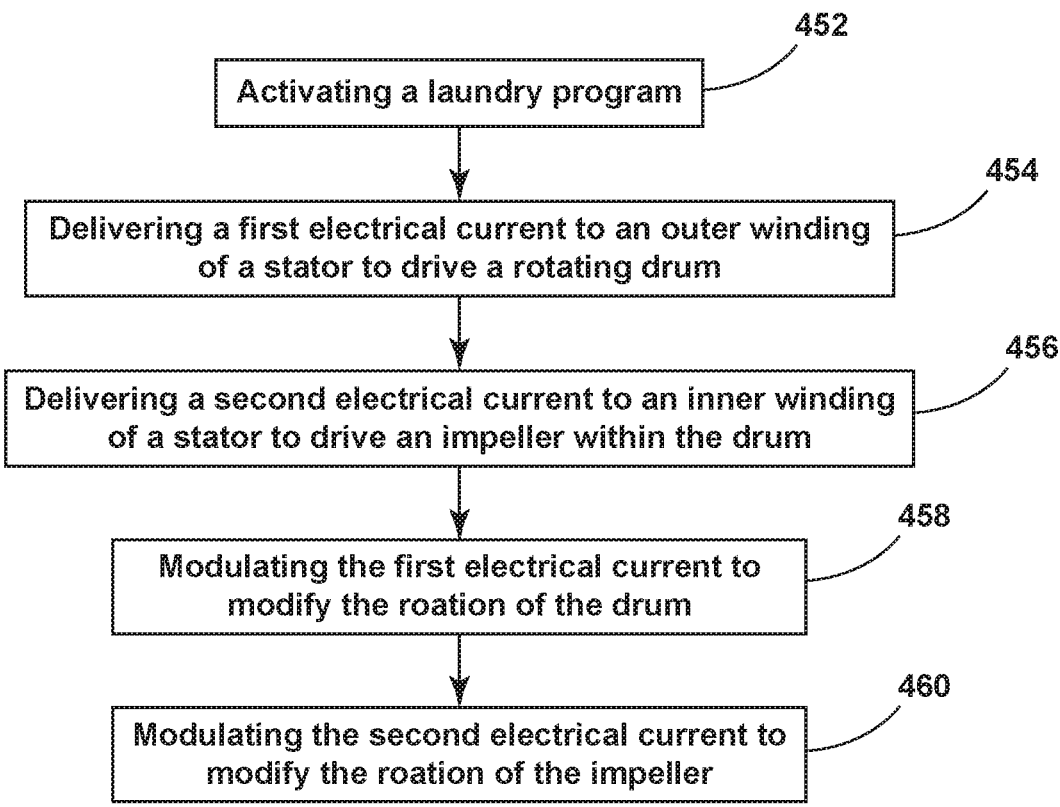
FIG. 15 is a schematic linear diagram illustrating a method for operating a dual-rotor motor for a front-load appliance.

Referring now to FIGS. 13 and 14, schematic diagrams illustrating operation of the drum 18 and secondary clothes mover 24 with respect to one another are exemplified. As exemplified in FIG. 13, operation of the drum 18 and secondary clothes mover 24 can be simultaneous and in opposing directions. The rotational speed of each component, exemplified in the y-axis, can vary between the drum 18 and the secondary clothes mover 24. The timing of operation of the secondary clothes mover 24 and drum 18, represented along the x-axis, can be simultaneous or substantially simultaneous. Additionally, as exemplified along the y-axis, rotation of each component can be in opposite directions, where the schematic illustrates a clockwise rotation above the x-axis and a counterclockwise rotation below the x-axis.

As exemplified in FIG. 14, operation of the outer and inner rotors 38, 40 for manipulating the drum 18 and secondary clothes mover 24 can also be non-simultaneous and can occur at a wide range of patterns and configurations. Accordingly, operation of the secondary clothes mover 24 and drum 18 may be in the same direction, but at different speeds. Additionally, operation of the drum 18 or secondary clothes mover 24 may be independent of one another, where only one of the outer and inner rotor 38, 40 is operated, the other of the outer and inner rotor 38, 40 may be in an idle condition that can rotate freely. It is also contemplated that one of the outer and inner rotors 38, 40 may be locked in rotational position to allow for the independent and sole operation of the outer or inner rotor 38, 40 with respect to the appliance 12. Again, a wide range of rotational and agitation configurations can be utilized using the dual-rotor motor 10 having independent operation of the outer and inner rotors 38, 40.

Referring now to FIGS. 7-15, having described various aspects of the dual-rotor motor 10 for the front-load appliance 12, a method 450 is disclosed for operating a dual-rotor motor 10 within a front-load appliance 12. According to the method 450, a laundry program is activated (step 452). Once the program is activated, a first electrical current 48 is delivered to an outer winding 36 in order to drive a rotating drum 18 for the appliance 12 (step 454). Subsequently, or simultaneously, a second electrical current 52 is delivered to an inner winding 34 to drive the secondary clothes mover 24 for the appliance 12 (step 456). During operation of the particular laundry program, the first electrical current 48 can be modulated to modify rotation of the drum 18 (step 458). This modulation of the first electrical current 48 can be independent of the delivery of the second electrical current 52. According to the method 450, the second electrical current 52 can also be modulated for modifying operation of the secondary clothes mover 24 (step 460). As with the first electrical current 48, modulation of the second electrical current 52 can be independent to the delivery of the first electrical current 48. Through the operation of the first and second electrical currents 48, 52 with respect to the outer and inner rotors 38, 40, independent and selective operation of the drum 18 and secondary clothes mover 24 can be used in the same or opposing directions, and through a wide range of rotational speeds.

Figure 16:
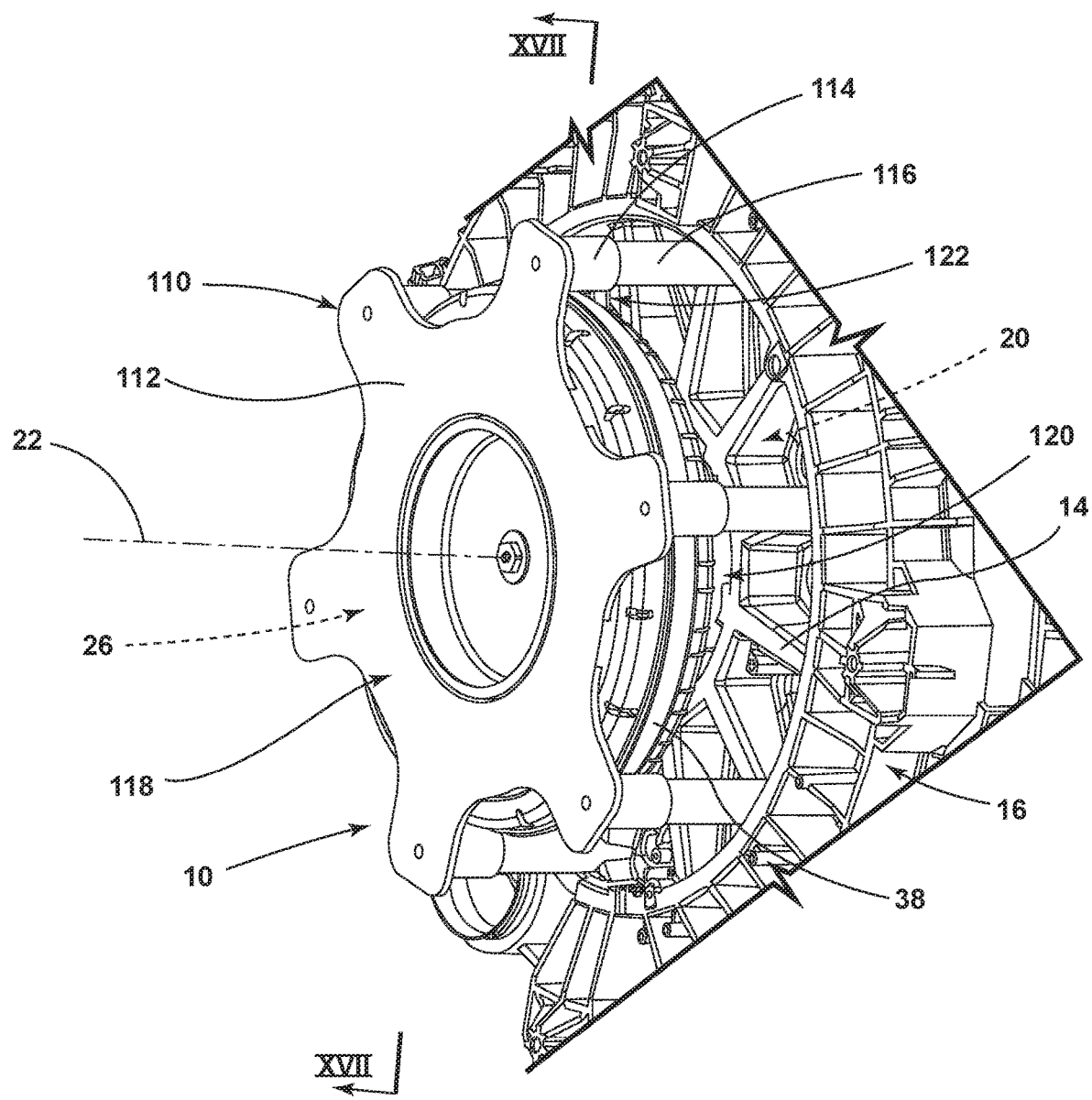
FIG. 16 is a rear perspective view of a structural fastener for securing the dual-rotor motor to the rear wall of the tub.
Figure 17:
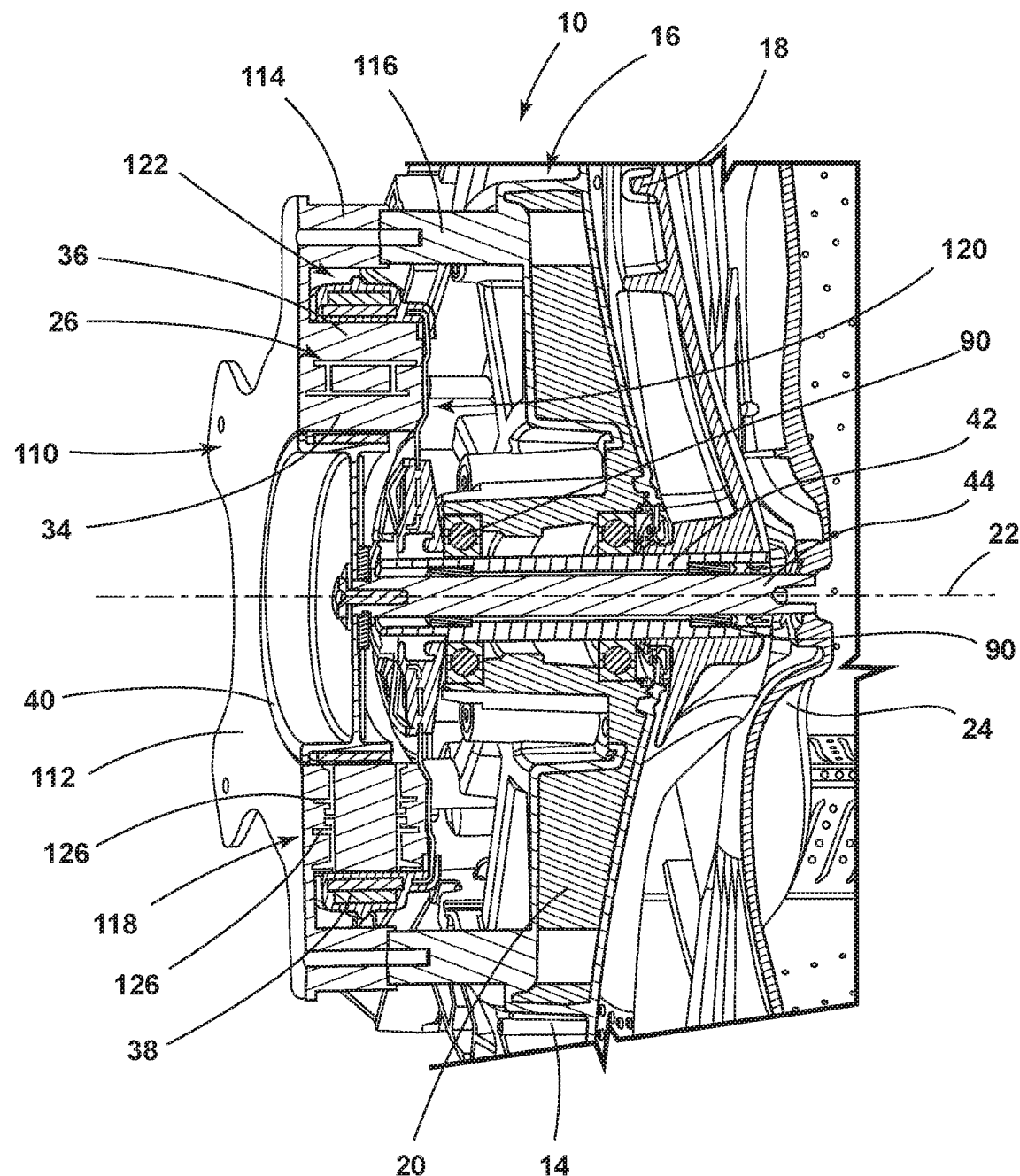
FIG. 17 is a cross-sectional perspective view of the dual-rotor motor of FIG. 16, taken at line XVII-XVII.
Figure 18:
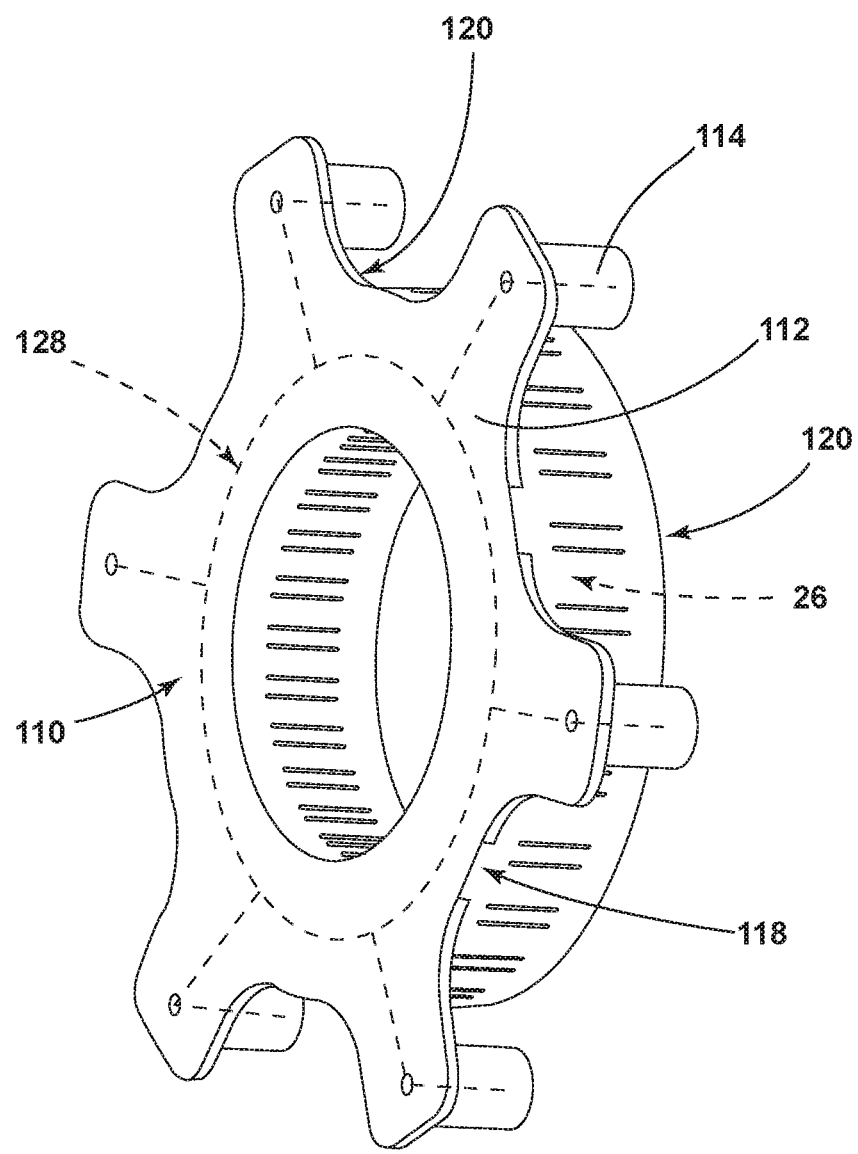
FIG. 18 is a rear perspective view of a structural overmold that forms an aspect of the structural fastener.

Referring now to FIGS. 16-18, the stator 26 for the dual-rotor motor 10 can be attached to the tub 16 via a structural fastener 110. This structural fastener 110 can include a plate 112 that is positioned behind the stator 26 and each of the outer and inner rotors 38, 40. The plate 112 of the structural fastener 110 extends outside of the outer rotor 38 and includes plate bosses 114 that extend toward the tub 16 to engage with tub bosses 116. These tub bosses 116 can be integrally formed within the plastic material of the tub 16. It is also contemplated that the tub bosses can extend from the hub 20 that is attached to or molded within the rear wall 14 of the tub 16. In this manner, the plate bosses 114 and the tub bosses 116 engage with one another outside of the outer rotor 38 for the dual-rotor motor 10. Accordingly, an operating space 120 is positioned between the stator 26 and the rear wall 14 of the tub 16. Within this operating space 120, the outer rotor 38 can rotate about the rotational axis 22, while the stator 26 is separately secured to the rear wall 14 of the tub 16 via the structural fastener 110.

As exemplified in FIGS. 16-18, the structural fastener 110 can include a structural overmold 118 that is defined by a plastic material that is injection molded over the entire stator 26 including the inner and outer windings 34, 36. This structural overmold 118 can also include the plate 112 and the plate bosses 114. Accordingly, the structural fastener 110 can be a single continuous structural overmold 118 that includes the stator 26 that is molded within. Various electrical components of the stator such as the connectors for attaching the first and second power modules 46, 50 can also be included within the structural overmold 118.

According to various aspects of the device, the structural overmold 118 can include a separate plate 112 or a frame 128, such as a metallic plate 112, metallic frame, or other similar structural member. The structural overmold 118 is present in such an embodiment to separate a metallic plate 112 from the stator 26 as well as the inner and outer windings 34, 36. The plate 112 can be fastened or otherwise attached to the central core 32. The plate bosses 114 can also be attached to or incorporated into the plate 112. It is also contemplated that the plate 112 can be attached to the central core 32 of the stator 26 and then overmolded with the structural overmold 118.

As exemplified in FIGS. 16-18, the operating space 120 includes a perimetrical channel 122 that is positioned between the plate bosses 114, tub bosses 116 and an outer surface of the stator 26. The outer rotor 38 is configured to operate within this perimetrical channel 122 as well as the operating space 120 that is positioned between the stator 26 and the rear wall 14 of the tub 16.

By forming the perimetrical channel 122 and the operating space 120, the outer rotor 38 can couple with the outer shaft 42 for operating the drum 18 about the rotational axis 22. This configuration also allows the inner rotor 40 to couple with the inner shaft 44 for operating the secondary clothes mover 24 about the rotational axis 22. Through this configuration of the structural fastener 110 having the operating space 120 and the perimetrical channel 122, the outer rotor 38 and inner rotor 40 are allowed to selectively and independently operate about the rotational axis 22, as discussed herein.

Figure 19:
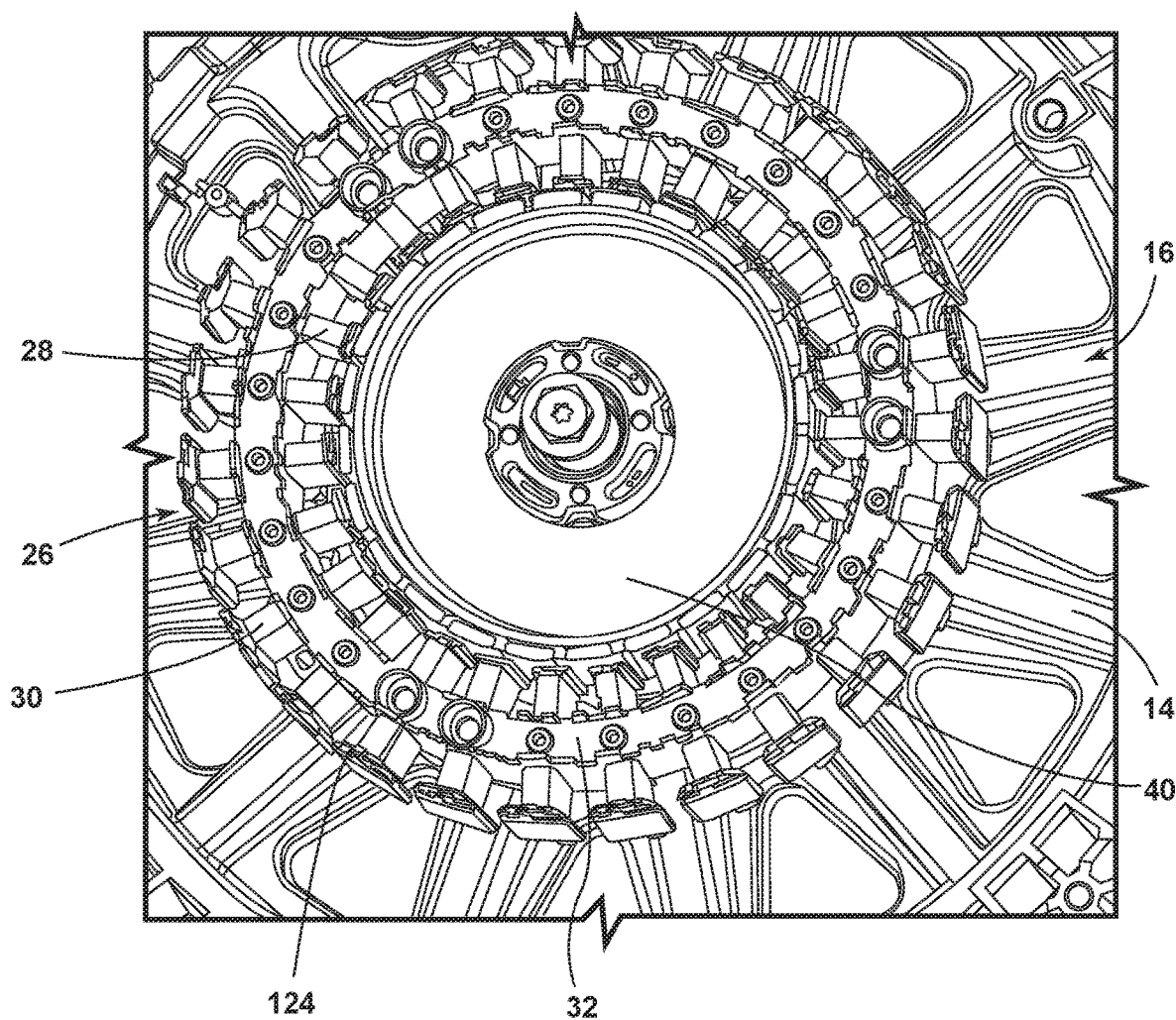
FIG. 19 is a rear perspective view of an alternate aspect of the stator for the dual-rotor motor.
Figure 20:
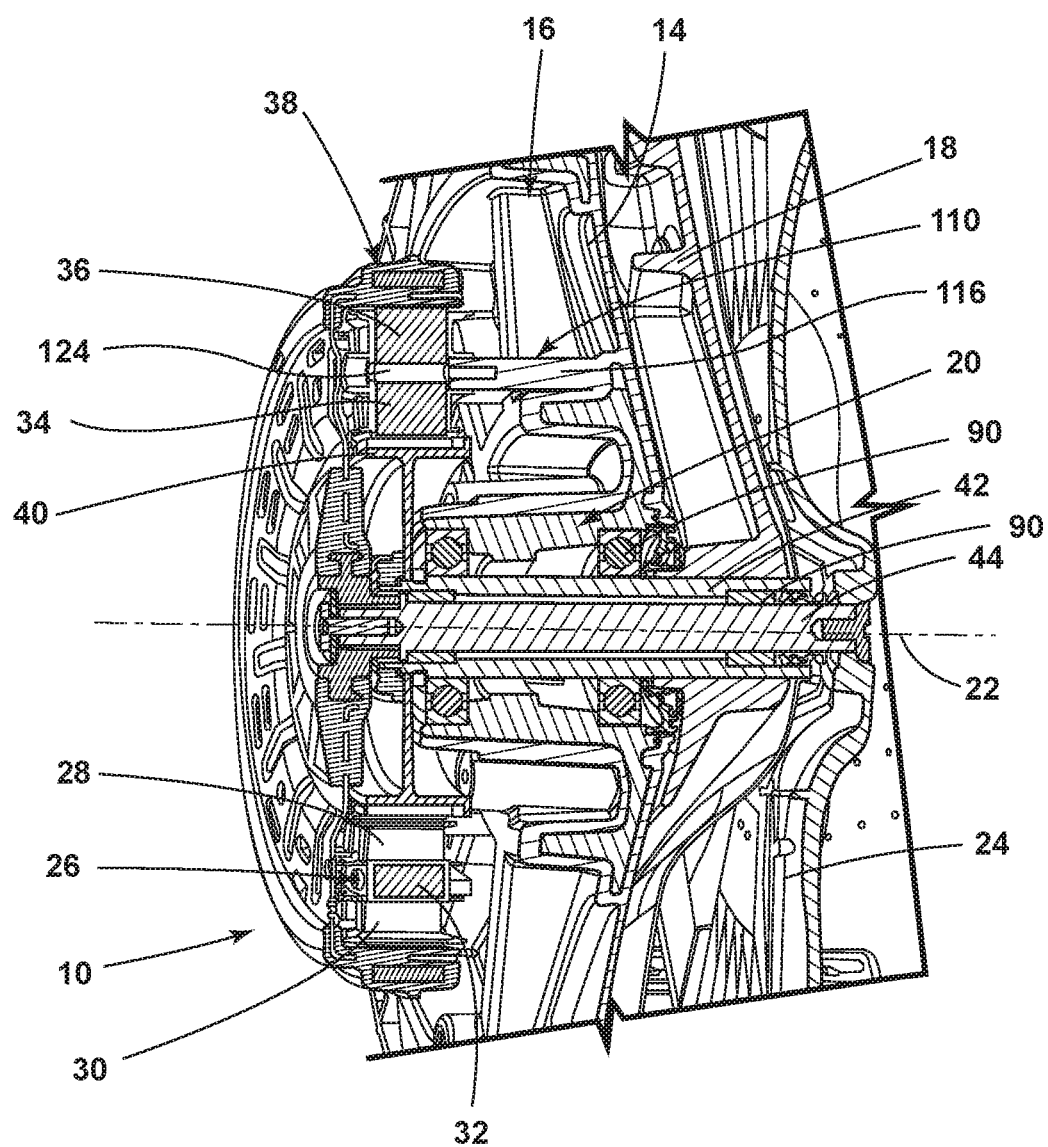
FIG. 20 is a cross-sectional perspective view of an alternate aspect of the dual-rotor motor.
Figure 21:
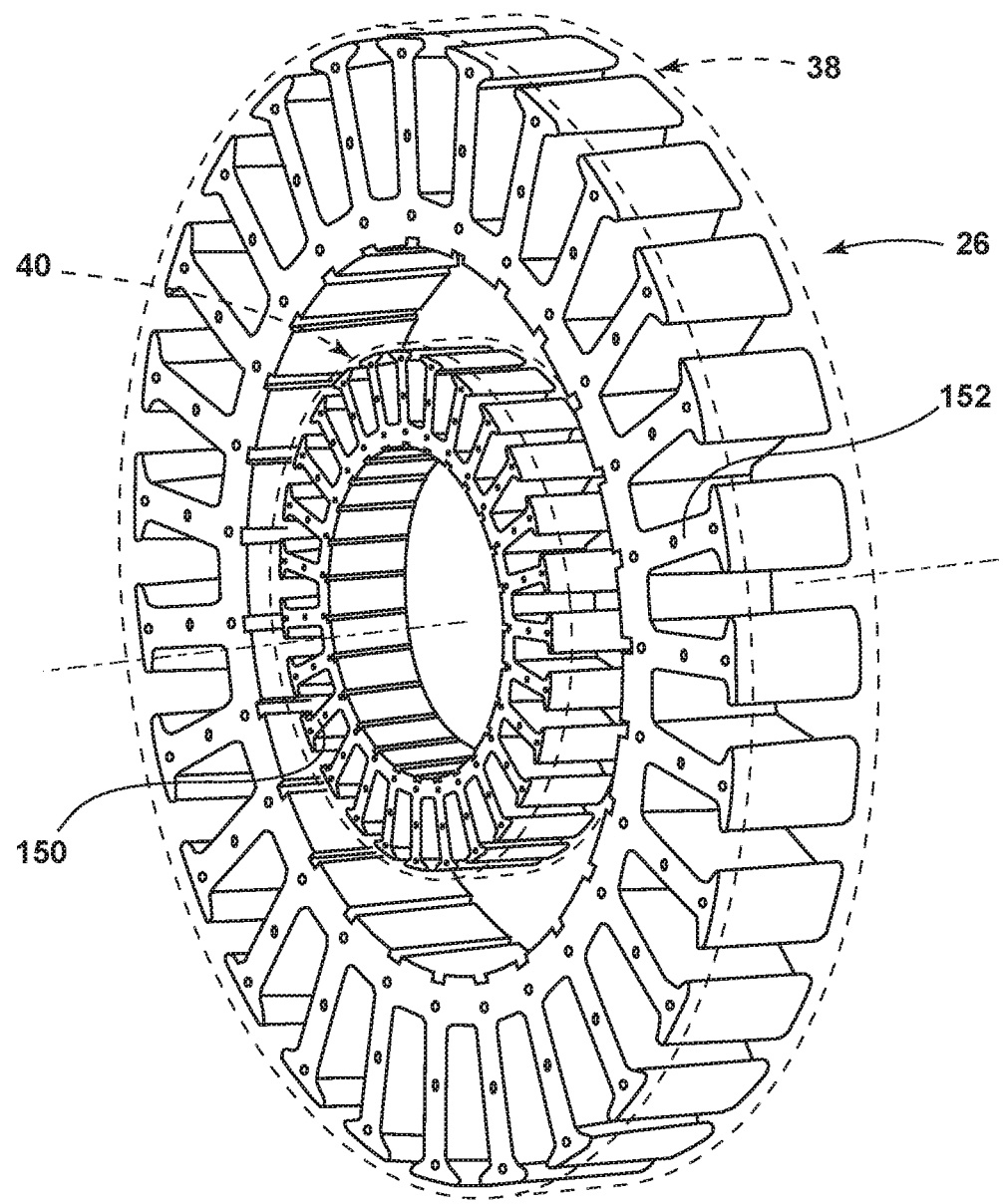
FIG. 21 is a side perspective view of an alternative aspect of the stator core having separate inner and outer stator cores.
Figure 22:
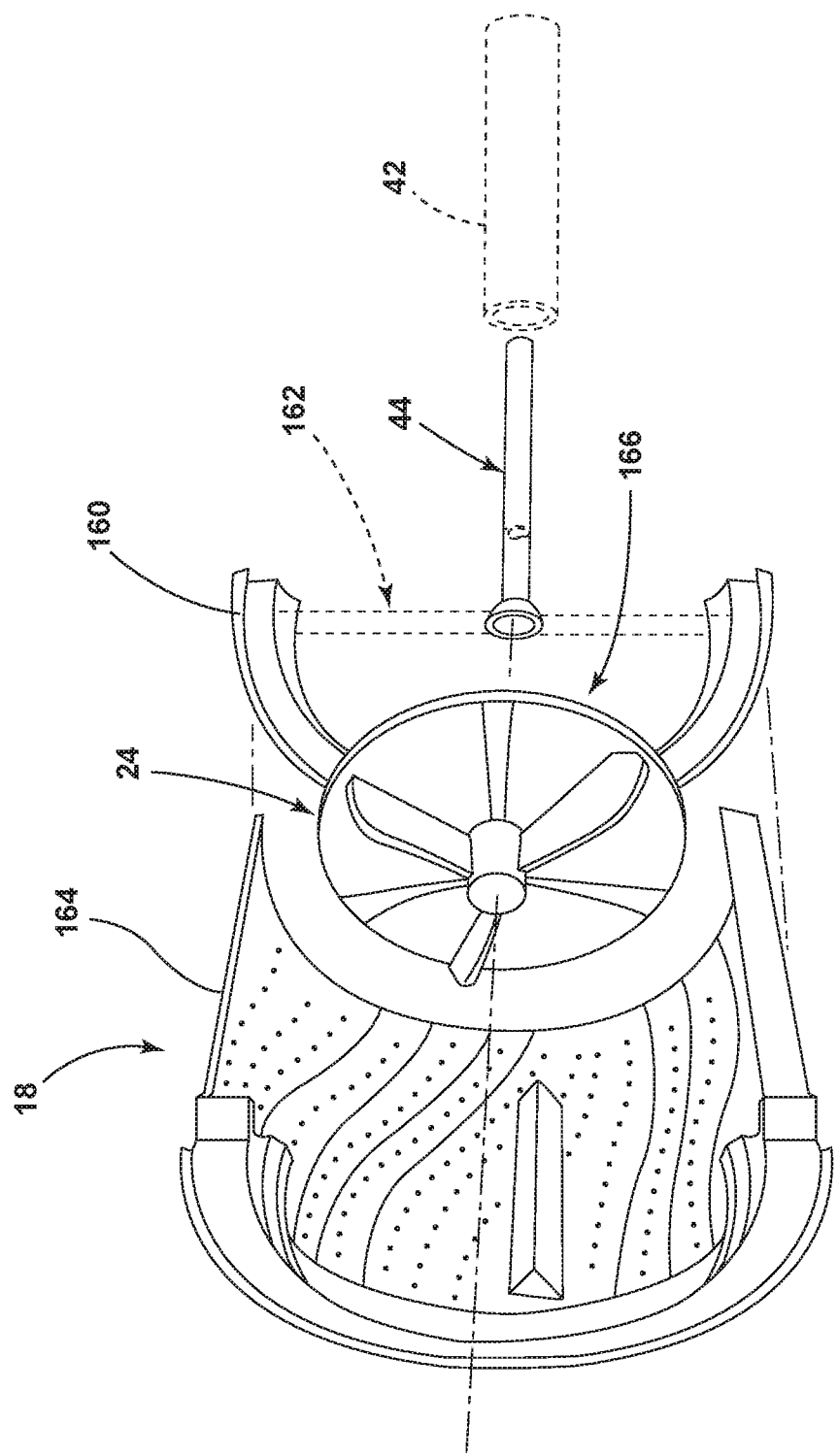
FIG. 22 is an exploded perspective view of the drum and the secondary clothes mover according to at least one aspect.

Referring now to FIGS. 19 and 20, where the outer rotor 38 is coupled with the inner shaft 44 and the inner rotor 40 is coupled with the outer shaft 42, the stator 26 can be attached directly to the rear wall 14 of the tub 16 at tub bosses 116. In this configuration, the stator 26 is attached to the tub bosses 116 through the central core 32 of the stator 26. In this manner, various core attachment points 124 can be spaced about the central core 32 for attaching the stator 26 to the tub bosses 116. As discussed above, the tub bosses 116 can be incorporated within the rear wall 14 of the tub 16. Alternatively, the tub bosses 116 can be integral with the hub 20 that is attached to or molded within the rear wall 14 of the tub 16.

Referring again to FIGS. 16-18, the plate bosses 114 of the structural fastener 110 can be integral with the structural overmold 118 that forms at least a portion of the structural fastener 110. It is contemplated that the plate bosses 114 can be separate components that are molded within, or attached to, the plate 112 of the structural fastener 110.

The number of plate bosses 114 and tub bosses 116 that are included within the structural fastener 110 can vary depending upon the design of the appliance 12. While six tub bosses 116 and six plate bosses 114 are shown, additional or fewer plate bosses 114 and tub bosses 116 can be included within the design for the structural fastener 110.

Through the use of the structural fastener 110, the stator 26, along with the inner and outer windings 34, 36 are secured to the rear wall 14 of the tub 16. The outer and inner rotors 38, 40 are secured to the rear wall 14 of the tub 16 via the bearings 90 that rotationally engage the outer rotor 38 and inner rotor 40 with the hub 20. Through this configuration, the outer shaft 42 and the inner shaft 44 are secured to the hub 20 via the bearings 90. The outer rotor 38 is then secured to the outer shaft 42 and the inner rotor 40 is secured to the inner shaft 44. This configuration allows for the outer rotor 38 and inner rotor 40 to freely rotate about the stator 26 for operating the drum 18 and the secondary clothes mover 24 in the selective and independent configuration described herein.

The configuration of the stator 26 that is secured to the rear wall 14 of the tub 16 via the structural fastener 110 allows for convenient attachment, removal and replacement of the stator 26, when necessary. To form the stator 26 along with the inner and outer windings 34, 36, the inner and outer windings 34, 36 are wound on the inner and outer poles 28, 30 of the stator 26. As discussed above, the inner windings 34 are wound on the inner poles 28. Separate outer windings 36 are wound in the outer poles 30. The central core 32 of the stator 26 can include a divider 126 that maintains a separation between the inner windings 34 and the outer windings 36. Once the inner and outer windings 34, 36 are wound on the inner poles 28 and the outer poles 30, respectively, the entire stator 26 and the inner and outer windings 34, 36 can be overmolded by the structural overmold 118 that forms at least a portion of the structural fastener 110. As discussed above, the structural fastener 110 can be entirely formed through the structural overmold 118. Alternatively, the structural fastener 110 can include a separate structural plate 112 or frame 128 and may also include separate structural members that at least partially form the plate bosses 114. These separate components are then formed within the structural overmold 118 for forming the entire structural fastener 110. The use of the structural overmold 118 serves to maintain a separation between the inner and outer windings 34, 36 and various metallic components that may be set within the structural fastener 110.

While a certain configuration of the structural fastener 110 is shown within FIGS. 16-18 and 19-20, it should be understood that alternative configurations of the structural fastener 110 may be included within the design for the dual-rotor motor 10. Typically, the structural fastener 110 allows for an attachment between the outer rotor 38 with the outer shaft 42 for operating the drum 18. Additionally, the configuration of the structural fastener 110 allows for an engagement with the inner rotor 40 with the inner shaft 44 for operating the secondary clothes mover 24.

According to another aspect of the present disclosure, a laundry appliance includes a drum that is rotationally operable about a rotational axis within a tub. The rotational axis is oriented in a generally horizontal configuration. An impeller is rotationally operable within the drum about the rotational axis. A dual-rotor motor is coupled to the drum and the impeller for providing separate and independent rotation of the drum and impeller about the rotational axis. An inner rotor of the dual-rotor motor is coupled with the impeller and an outer rotor of the dual-rotor motor is coupled with the drum.

According to another aspect, a stator has inner and outer poles that extend from a central core. Inner windings are disposed on the inner poles, wherein the inner rotor is in electromagnetic communication with the inner windings. Outer windings are disposed on the outer poles wherein the outer rotor is in electromagnetic communication with the outer windings.

According to yet another aspect, an outer shaft that extends between the outer rotor and the drum. An inner shaft is positioned within the outer shaft and extending between the inner rotor and the impeller.

According to another aspect of the present disclosure, the stator includes a unitary core having a plurality of outer teeth that define the outer poles and a plurality of inner teeth that define the inner poles.

According to another aspect, the stator includes an inner stator assembly and a separate outer stator assembly.

According to yet another aspect, the outer rotor and the inner rotors are free of positioning sensors.

According to another aspect of the present disclosure, the inner and outer windings are separately coupled to dedicated power modules. The dedicated power modules include a first power module that selectively delivers a first electrical current to the outer windings, and a second power module that selectively delivers a second electrical current to the inner windings.

According to another aspect, a controller operates the first and second power modules.

According to yet another aspect, the controller assembly includes separate and dedicated controllers that separately operate the first and second power modules.

According to another aspect of the present disclosure, the generally horizontal configuration includes the rotational axis that is positioned at an angle with respect to a horizontal plane.

According to another aspect, the inner and outer rotors are each independently and separately operable to rotate about the rotational axis at dedicated speeds and in dedicated rotational directions about the rotational axis.

According to yet another aspect, a dual-rotor motor for a horizontal axis laundry appliance includes a stator having inner and outer poles that extend from a central core. Inner windings are disposed on the inner poles. Outer windings are disposed on the outer poles. An outer rotor is in electromagnetic communication with the outer windings. An inner rotor is in electromagnetic communication with the inner windings. An outer shaft extends between the outer rotor and a drum. An inner shaft that is positioned within the outer shaft and extending between the inner rotor and an impeller.

According to another aspect of the present disclosure, the stator includes a unitary core having a plurality of outer teeth that define the outer poles and a plurality of inner teeth that define the inner poles.

According to another aspect, the outer rotor and the inner rotors are free of positioning sensors.

According to yet another aspect, the outer shaft is a hollow shaft and the inner shaft is a substantially solid shaft.

According to another aspect of the present disclosure, the inner and outer windings are separately coupled to dedicated power modules. The dedicated power modules include a first power module that selectively delivers a first electrical current to the outer windings, and a second power module that selectively delivers a second electrical current to the inner windings.

According to another aspect, the inner and outer rotors are each independently and separately operable to rotate about a rotational axis at dedicated speeds and in dedicated directions about the rotational axis.

According to yet another aspect, a controller assembly operates the first and second power modules. The controller assembly includes separate and dedicated first and second controllers that separately operate the first and second power modules.

According to another aspect of the present disclosure, a laundry appliance includes a drum that is rotationally operable about a rotational axis within a tub. The rotational axis is oriented in a generally horizontal configuration. An impeller is rotationally operable within the drum about the rotational axis. A dual-rotor motor is coupled to the drum and the impeller for providing separate and independent rotation of the drum and the impeller about the rotational axis, the motor comprising a stator having inner and outer poles that extend from a central core. Inner windings are disposed on the inner poles. Outer windings are disposed on the outer poles. An outer rotor is in electromagnetic communication with the outer windings. An inner rotor is in electromagnetic communication with the inner windings. An outer shaft that extends between the outer rotor and the drum. An inner shaft is positioned within the outer shaft and extending between the inner rotor and the impeller.

According to another aspect, a first power module selectively delivers a first electrical current to the outer windings. A second power module selectively delivers a second electrical current to the inner windings. A controller assembly operates the first and second power modules. The controller assembly includes separate and dedicated first and second controllers that separately operate the first and second power modules. The inner and outer rotors are each independently and separately operable to rotate about the rotational axis at dedicated speeds and in dedicated rotational directions about the rotational axis.

The embodiments described above are only intended to describe the preferred embodiments of the present device, and are not intended to limit the scope of the present device, and various embodiments of the present device may be made by those skilled in the art without departing from the spirit of the device. Modifications and improvements are intended to fall within the scope of the device as defined by the appended claims.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:
    a drum that is rotationally operable about a rotational axis within a tub, wherein the rotational axis is oriented in a generally horizontal configuration;
    an impeller that is rotationally operable within the drum about the rotational axis;
    a dual-rotor motor that is coupled to the drum and the impeller for providing separate and independent rotation of the drum and the impeller about the rotational axis, wherein an inner rotor of the dual-rotor motor is coupled with the impeller and an outer rotor of the dual-rotor motor is coupled with the drum;
    a structural fastener that attaches the dual-rotor motor to the tub, the structural fastener having a plate positioned behind the dual-rotor motor and plate bosses that extend from the plate to the tub, wherein the dual-rotor motor operates between the plate and the tub; and
    a structural overmold, wherein the plate, the plate bosses and a stator of the dual-rotor motor are incorporated within the structural overmold.

2. The laundry appliance of claim 1, wherein the dual-rotor motor comprises:
    inner and outer poles of the stator that extend from a central core;
    inner windings disposed on the inner poles, wherein the inner rotor is in electromagnetic communication with the inner windings; and
    outer windings disposed on the outer poles wherein the outer rotor is in electromagnetic communication with the outer windings.

3. The laundry appliance of claim 1, further comprising:
    an outer shaft that extends between the outer rotor and the drum; and an inner shaft that is positioned within the outer shaft and extending between the inner rotor and the impeller.

4. The laundry appliance of claim 2, wherein the stator includes a unitary core having a plurality of outer teeth that define the outer poles and a plurality of inner teeth that define the inner poles.

5. The laundry appliance of claim 1, wherein the stator includes an inner stator assembly and a separate outer stator assembly.

6. The laundry appliance of claim 2, wherein the outer rotor and the inner rotors are free of positioning sensors.

7. The laundry appliance of claim 2, wherein the inner and outer windings are separately coupled to dedicated power modules, wherein the dedicated power modules include a first power module that selectively delivers a first electrical current to the outer windings, and a second power module that selectively delivers a second electrical current to the inner windings.

8. The laundry appliance of claim 7, further comprising:
a controller that operates the first and second power modules.

9. The laundry appliance of claim 8, wherein the controller includes separate and dedicated controllers that separately operate the first and second power modules.

10. The laundry appliance of claim 1, wherein the generally horizontal configuration includes the rotational axis that is positioned at an angle with respect to a horizontal plane.

11. The laundry appliance of claim 7, wherein the inner and outer rotors are each independently and separately operable to rotate about the rotational axis at dedicated speeds and in dedicated rotational directions about the rotational axis.

12. A laundry appliance comprising:
a drum that is rotationally operable about a rotational axis within a tub, wherein the rotational axis is oriented in a generally horizontal configuration;
an impeller that is rotationally operable within the drum about the rotational axis;
a dual-rotor motor that is coupled to the drum and the impeller for providing separate and independent rotation of the drum and the impeller about the rotational axis, the dual-rotor motor comprising:
a stator having inner and outer poles that extend from a central core;
inner windings disposed on the inner poles;
outer windings disposed on the outer poles;
an outer rotor in electromagnetic communication with the outer windings;
an inner rotor in electromagnetic communication with the inner windings;
an outer shaft that extends between the outer rotor and the drum;
an inner shaft that is positioned within the outer shaft and extending between the inner rotor and the impeller;
a structural fastener having a metallic plate and metallic plate bosses that attach the stator and the structural fastener to the tub, and wherein the structural fastener locates the stator between the tub and the metallic plate of the structural fastener; and
a structural overmold that incorporates the stator, the metallic plate, and the metallic plate bosses of the structural fastener within the structural overmold.

13. The laundry appliance of claim 12, further comprising:
a first power module that selectively delivers a first electrical current to the outer windings;
a second power module that selectively delivers a second electrical current to the inner windings; and
a controller assembly that operates the first and second power modules, wherein the controller assembly includes separate and dedicated first and second controllers that separately operate the first and second power modules, wherein the inner and outer rotors are each independently and separately operable to rotate about the rotational axis at dedicated speeds and in dedicated rotational directions about the rotational axis.

* * * * *